(12) United States Patent
Burch et al.

(10) Patent No.: US 7,433,365 B1
(45) Date of Patent: Oct. 7, 2008

(54) SYSTEM ARCHITECTURE FOR LINKING CHANNEL BANKS OF A DATA COMMUNICATION SYSTEM

(75) Inventors: Richard A. Burch, Madison, AL (US); Neil M. Jensen, Madison, AL (US); Dennis B. McMahan, Huntsville, AL (US); Timothy David Rochell, Elkmont, AL (US); Robert James Toth, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 788 days.

(21) Appl. No.: 10/930,101

(22) Filed: Aug. 31, 2004

(51) Int. Cl.
*H04J 3/16* (2006.01)

(52) U.S. Cl. .................. 370/437; 370/535
(58) Field of Classification Search ............ 370/437, 370/348, 442, 443, 462, 535, 536, 45, 369, 370/376, 247, 251, 271, 280, 349, 389; 709/211, 709/249
See application file for complete search history.

(56) References Cited

U.S. PATENT DOCUMENTS 7,116,674 B2 * 10/2006 Shi ............................ 370/419
7,308,006 B1 * 12/2007 Banerjee et al. ............. 370/535

\* cited by examiner

*Primary Examiner*—Chi H. Pham
*Assistant Examiner*—Alexander Boakye
(74) *Attorney, Agent, or Firm*—Allen, Dyer, Doppelt, Milbrath & Gilchrist, P.A.

(57) ABSTRACT

A single switch fabric-based, multi-channel bank digital subscriber line access multiplexer includes a master channel bank containing a master switch module in which the switch fabric and a downstream-directed traffic scheduler reside, and one or more expansion channel banks that are linked with the master channel bank by way of upstream and downstream communication links. Distributed among the channel banks are respective policing mechanisms and cell rate control mechanisms that control upstream-directed communications from line card ports of each expansion channel bank to the switch fabric. Downstream data transmissions are locked to network timing, and are scheduled by a centralized scheduling mechanism resident in the master channel bank.

20 Claims, 11 Drawing Sheets

SYSTEM ARCHITECTURE FOR LINKING CHANNEL BANKS OF A DATA COMMUNICATION SYSTEM

FIELD OF THE INVENTION

The present invention relates in general to telecommunication systems and subsystems thereof, and is particularly directed to a multi-channel bank digital subscriber line access multiplexer (DSLAM) architecture, having a master channel bank through which a single connection to the network is provided, and one or more auxiliary or expansion equipment shelves/channel banks, that are coupled with the master channel bank by way of a Gigabit Ethernet communication link, without having to expropriate line card slots of the master channel bank for inter-channel bank connections.

BACKGROUND OF THE INVENTION

An on-going objective of the telecommunications industry is to increase the number of customers that may be serviced by a single channel bank connection with a network, such as but not limited to a DS3 or OC3 network connection. To date, this objective has been addressed primarily by using one of two approaches: 1—bus extension; and 2—channel bank subtending. Pursuant to the first approach, diagrammatically illustrated in FIG. 1, the physical length of the backplane bus of a primary or master channel bank is increased by means of a bus extension cable, such as a ribbon cable, in order to allow more line cards to be daisy chain-connected to the bus. In this type of architecture, upstream directed data (from the customer to the network) passes from a customer interface with a line card onto the bus extension, and then into the switching fabric through which a connection with the network is afforded, using a policing engine (a flow control mechanism) resident within the switch fabric of the master channel bank. Downstream directed data (from the network to a customer) enters the switch fabric where it is scheduled for downstream routing, and then transported across the bus extension into a line card and passed on to the customer. Information concerning policing, scheduling and queuing engines is contained in *ITU-T Recommendation I-371 Traffic Control and Congestion Control for B-ISDN*.

In the second approach, diagrammatically illustrated in FIG. 2, multiple line card slots of the master channel bank are usurped by channel bank expansion cards, respective ones of which are linked to associated subtended channel banks. In this type of architecture, upstream-directed data passes from the customer interface into a line card of one of the subtended channel banks. From the line card, the data passes into the subtended channel bank's switch fabric, where the data is policed and scheduled for delivery to the network, via the master channel bank's network connection. However, before it is delivered to the network, the data is passed over the primary channel bank's bus into another switch fabric, where is again policed and scheduled. It is then passed onto the network connection for delivery to the network. Downstream-directed data enters the switch fabric of the master channel bank from the network connection, and is transferred therefrom down to a network card (which typically occupies two line card slots of the master channel bank), which passes the data on to the switch fabric of an subtended channel bank, for delivery to a line card of that channel bank. Every time data enters an subtended bank's switch fabric it is policed and scheduled.

The first, bus extension approach has the following limitations. Given the fact that the extension bus is shared among the master channel bank and one or more expansion channel banks, a problem may arise if one of the channel bank cards malfunctions and seizes control of the extension bus. This could terminate or prevent data transfers on the shared bus. Moreover, since the channel banks are connected by way of a bus extension cable, there is a practical, noise-coupling limitation as to the number of channel banks that can be daisy chained together. In addition, the bus extension cable is usually bulky and expensive.

The second, network card extension approach is also limited by a number of factors. A first is the fact that since the channel banks are interlinked by using network connections that usurp multiple line card slots, the primary bank loses the availability of line cards that would otherwise be used to provide service to customers. Also, the use of network cards adds a greater expense for data expansion, and limits the number of customers that can be serviced by the host channel bank. In addition, as each of the subtended channel banks requires a network connection, the switch fabric must be replicated on each subtended channel bank, which adds to the expense. Replication of the switch fabric also implies the need to replicate policing and scheduling mechanisms.

SUMMARY OF THE INVENTION

In accordance with the present invention, drawbacks of conventional channel bank expansion architectures, such as, but not limited to those described above, are effectively obviated by a new and improved single switch-fabric based, multi-channel bank DSLAM architecture. This architecture includes a primary channel bank for housing a master channel bank containing a primary switch module in which the switch fabric and a downstream-directed traffic scheduler reside, as well as expansion channel banks (housed in expansion equipment shelves) that are linked with the master channel bank by way of upstream and downstream communication links, and distributed within which are respective policing mechanisms and cell rate control mechanisms for controlling upstream-directed communications from line card ports of each expansion channel bank.

The primary shelf includes a 'primary' switch module and a plurality of line cards, multiple ports of which are coupled to customers served by the master channel bank. Similarly, the expansion channel banks include 'expansion' switch modules and respective pluralities of line cards, multiple ports of which are coupled to customers served by the expansion channel banks. The primary switch module of the master channel bank is coupled with the switch fabric resident in the master channel bank and includes a set of upstream and downstream multiplexers that connect to the switch modules of the expansion channel banks by way of an inter-channel bank communication link, such as a Gigabit Ethernet link. This inter-channel bank communication link includes respective upstream and downstream segments, preferably configured as a Giga-bit Media Independent Interface (GMII).

The upstream multiplexer of the master channel bank has inputs coupled to the output of a modified strict queuing engine, which receives customer data from associated line card ports of the master channel bank, an upstream GMII segment from an adjacent expansion channel bank, and a CPU/buffer for the master channel bank. The output of the upstream multiplexer of the master channel bank is coupled to the switch fabric. The switch fabric, in turn, is coupled to a network interface. The downstream multiplexer of the master channel bank has a first input coupled to the master channel bank's CPU/buffer, and a second input coupled to the output of a downstream communication scheduler, which is coupled with the switch fabric. A first output port of the master channel bank's downstream multiplexer is coupled to that channel bank's backplane and thereby to its line cards. A second output is coupled by way a downstream GMII segment to the switch module of the immediately adjacent downstream expansion channel bank. In a similar manner, the expansion switch module of a respective expansion channel bank contains upstream and downstream multiplexer circuitry through which upstream and downstream communications are conducted over respective GMII upstream and GMII downstream segments that link the master channel bank to the expansion channel banks in a daisy chain manner.

Timing over the upstream GMII link to the switch fabric of the master channel bank and out to the network is handled by the switch fabric and the network, since all data traffic from the line card ports and intended for the network is temporarily stored in a switch fabric buffer, and controllably read out at whatever data rate the network is using. However, in the downstream direction, communications are scheduled and locked to network timing, in order to be correct for the line card ports to the customers.

Within a respective channel bank, data is interfaced from a line card to the upstream GMII link by way of a modified strict queuing engine, inputs to which are from a plurality of cell buffers of respectively different priorities or classes of service. These include a constant bit rate buffer having the highest priority, a real time variable bit rate buffer, which has the next highest priority, a non-real time variable bit rate buffer, which has the second lowest priority, and an undefined bit rate buffer having the lowest priority. The cell buffers of a respective channel bank are loaded with asynchronous transfer mode (ATM) cells, under the control of that channel bank's policing engine, inputs to which are supplied by line card ports of the channel bank to which customer data is coupled.

A channel bank's policing engine is preferably configured in the manner described in co-pending U.S. patent application Ser. No. 10/930,086 filed on Aug. 31, 2004, entitled: "Policing Engine Providing Dynamic Adjustment of Peak and Sustained Data Cell Rates and Efficient Transfer of AAL5 Cells," by R. Burch et al, hereafter referred to as the '086 application, assigned to the assignee of the present application and the disclosure of which is incorporated herein. The purpose of the policing engine is to control the rate at which information cell packets may be written into various buffers associated with respectively different classes of service to which a customer may subscribe. This data rate control is such that the flow of data cells into the buffers both conforms with subscription rates of the various line card ports, and also avoids writing cells into the buffers at a rate faster then the rate at which the buffers are read out for uplink transport to the switch fabric and application to the network.

The rate at which the output of a modified strict queuing engine of a respective channel bank is coupled to its associated upstream multiplexer is selectable in accordance with bandwidth limitations of the system, in particular the combined upstream data rate at the input to the switch fabric. For purposes of 'fairness' among all of the equipment shelves contained in the system, the data rate limitation is maintained to be the same for each channel bank, regardless of changes in system configuration. The data rate is provisioned by the supervisory control processor of the master channel bank among the various channel banks of the system due to the fact that, irrespective of changes to the system, the master channel bank is able to dynamically track how many shelves make up the system and where those expansion shelves are located relative to the primary shelf.

Data transmitted in the downstream direction is one of two types. It is either CPU data including shelf-provisioning data, or data sourced from the network and intended for a delivery by a line card port to a customer. In order to be properly deliverable to a customer, data transmissions along the downstream GMII segments must be locked to network timing, and they must be scheduled. In order to lock downlink transmissions to network timing, advantage is taken of clock recovery functionality that is built into the Gigabit Ethernet transceiver circuitry to which downstream GMII segments are connected. The Gigabit Ethernet transceiver has a data port and a clock recovery port, which is coupled with a phase locked loop, the loop producing a transmit clock that is substantially free of jitter and locked to network timing. The clock output of the phase locked loop is used as the transmission clock for a transmitter section of the Gigabit Ethernet transceiver, to which data intended for transmission over the next downstream Gigabit Ethernet segment to the next downstream shelf is coupled. Interconnecting the respective GMII segments in this manner provides locked to network timing-synchronization of the daisy-chaining of the downstream communication links among successive equipment shelves.

In addition to being locked to network timing, customer-destined data communications must be scheduled for transmission to its destination link card port. For this purpose, data that has been buffered from the network into switch-fabric buffer circuitry, is read out from its switch fabric buffer and transmitted at a time that is specified by a centralized scheduling mechanism resident in the master channel bank. The scheduling mechanism is preferably configured in the manner described in co-pending U.S. patent application Ser. No. 10/930,095, filed Aug. 31, 2004, entitled: "Primary Channel Bank-Resident Mechanism for Scheduling Downstream Data Transmissions to Ports of Multiple Channel Bank," by R. Burch et al, hereinafter referred to as the '095 application, assigned to the assignee of the present application and the disclosure of which is incorporated herein.

In accordance with the scheduling mechanism disclosed in the '095 application, the downstream data transport scheduler subsystem comprises a set of N data transport schedulers, where N is the number of data ports served by the multiple channel banks, so that each downstream scheduler is effectively a 'per port' scheduler. As such, each scheduler is associated with a respective one of a plurality of ATM cell buffers of the switch fabric, the cell buffers, in turn, being associated with the ports of the line cards of the primary and secondary channel banks.

A respective per port scheduler contains an accumulator, the contents of which are sequentially incremented by a scheduler clock, and monitored by an associated set of scheduler control logic or scheduler controller, in order to specify the time at which an ATM cell is read out from its switch fabric buffer for transmission to its associated destination port. Each scheduler has an input port to which a quantity M is supplied. The value of M is defined by a prescribed relationship between the size of an ATM cell, the data rate of the port with which the scheduler is associated, and a scheduler clock that is used to update the contents of the accumulator and to control the operation of the scheduler's control logic.

The quantity M corresponds to that fraction of an ATM cell, by which the contents of the accumulator must be incremented at each scheduler clock signal (i.e. once per scheduler clock period), for the scheduler to properly read out the contents of the ATM cell buffer at the intended data rate of the destination port. For this purpose, the quantity M is coupled to an adder, the output of which is supplied to a subtraction unit, whose output is coupled to an upper limit comparator. The output of the upper limit comparator is coupled to the scheduler controller and to an accumulator register, whose contents are monitored by a scheduler controller.

The subtraction unit is coupled to selectively receive from the scheduler controller a prescribed value C corresponding to that count value of the register that equates exactly to one cell. The scheduler controller monitors the contents of its associated cell buffer within the switch fabric, as well as the contents of the register, and generates a 'transfer cell' output, in response to the cell buffer containing a complete ATM cell, and in response to the contents of the accumulator register being greater than the summation of successive ones of the value M that corresponds to a complete ATM cell. When generating this transfer cell output, the scheduler controller causes the subtraction unit to subtract the value C from the summation output produced by the adder, thereby reducing the contents of the accumulator register by a count value that corresponds to one complete ATM cell.

The upper limit comparator compares the output of the subtraction unit with the highest count value that can be clocked into the accumulator register without causing the register to overflow. As long it is less than this upper limit value, the output of the subtraction unit is coupled by the limit comparator to the accumulator register, so that the output of the subtraction unit may be clocked into the accumulator register by an update clock. However, if the output of the subtraction unit reaches the upper limit value, the upper limit comparator disables further incrementing of the accumulator register, until the output of the subtraction unit falls below the upper limit value.

As the accumulator register is being sequentially incremented by the quantity M at the clock rate of the scheduler clock, the scheduler controller checks the state of its associated cell buffer to determine whether or not a complete cell has been loaded into the associated per port buffer within the switch fabric. In addition, the controller monitors the output of the upper limit comparator and the contents of the accumulator register to determine whether the upper limit comparator indicates that the accumulator register has reached its maximum count value, or whether the contents of the accumulator register has accumulated to a value greater than that corresponding to one complete cell.

In response to the per port cell buffer containing a complete cell, and in response to either of the upper limit comparator indicating that the accumulator register has reached its maximum count value, or the contents of the accumulator register having accumulated to a value greater than that corresponding to one complete cell, the controller issues a 'transfer cell' command. This command causes the data cell to be read out of its per port buffer and transmitted downlink to its associated port. In addition, upon issuing a transfer cell command, the controller supplies the cell equivalent value C to the subtraction unit, causing the contents of the accumulator register to be reduced by the value C, at the next scheduler update clock signal.

A further feature of the DSLAM architecture of the present invention is the use of an inter-channel bank communication mechanism, in particular, a shelf addressing and identification protocol, through which the control processor of the master shelf learns of and handles changes in system configuration, such as the addition, removal or replacement of individual expansion shelves. Through this mechanism, the master channel bank dynamically tracks how many shelves make up the system and where the expansion shelves are located, relative to the master.

In accordance with a preferred embodiment, this expansion shelf addressing and identification protocol corresponds to that described in co-pending patent application Ser. No. 10/930,102 (hereinafter referred to as the '102 application) filed on Aug. 31, 2004, by R. Toth et al, entitled: "Method and System for Preserving Channel Bank Provisioning Information When Unit Location Changes Within Multi-Shelf Equipment Rack," assigned to the assignee of the present application and the disclosure of which is incorporated herein.

Pursuant to the methodology disclosed in the '102 application, the master shelf assigns each expansion channel bank a shelf identifier code, which is included as part of the header of any information packet between the master shelf and an expansion channel bank. Whenever a message is transmitted downstream from the master, a respective expansion channel bank will compare the shelf ID code it has previously been assigned by the master with the shelf ID field in the packet. If the two IDs match, the shelf captures the packet. In addition, irrespective of whether a shelf's ID code matches the shelf ID field of the packet, if the shelf address field of the packet has a value of one, the expansion shelf will capture the packet. The shelf address field enables the master to keep track of changes to the participation of expansion shelves within the overall system.

During the initialization of an expansion channel bank, the master channel bank assigns the expansion channel bank a shelf identifier or shelf ID code; the shelf ID code is the logical address of the expansion channel bank. Thereafter, the assigned shelf ID code is included as part of the header of any information packet between the master channel bank and an expansion channel bank. In addition, except for the special case of an initialization query or 'discovery' packet used by the master to locate an uninitialized expansion channel bank, whenever a packet is transmitted from the master channel bank to a downstream destination channel bank, the master channel bank inserts into the header a shelf address code representative of how many expansion shelves away the master believes the expansion channel bank to be. When a 'discovery' packet is transmitted by the master, the address and ID fields of the packet are set to all ones and there is no decrementing of the all ones address field by any expansion shelf.

As a packet is forwarded from the master downstream among the expansion shelves in a daisy chain manner, each expansion channel bank will compare its shelf ID code with the shelf ID field in the packet. If the two IDs match, the shelf captures the packet. In addition, irrespective of whether a shelf's ID code matches the shelf ID field of the packet, if the shelf address field of the packet has a value of one, the shelf will capture the packet. The address field and the shelf ID enable the master to keep track of changes to participation of expansion shelves within the system.

The shelf address code is used to indicate the physical location of an expansion shelf relative to the master. Whenever a packet is sent by the master in a downstream direction to a destination expansion channel bank, the shelf address field is controllably decremented by a value of one by each intermediate expansion shelf between the master shelf and the destination shelf. As a result, when the packet arrives at the destination shelf, the shelf address field should have a value of one. As pointed out above, the fact that the shelf address field has a value of one will cause the expansion channel bank to capture the packet.

In a complementary manner, whenever a packet is sent by an expansion channel bank in an upstream direction to the master channel bank, the shelf address field is initially set at a value of one by the packet-sourcing slave shelf. Thereafter, the shelf address field is controllably incremented by a value of one by each expansion channel bank between the packet-sourcing expansion shelf and the master. As a result, when the packet arrives at the master shelf, the shelf address field will have a value indicating how many shelves away is the shelf sourcing the packet.

When an expansion shelf is initially inserted into a shelf bay and powered up, it is in an uninitialized state, with its shelf ID code yet to be assigned by the master. In accordance with the invention, an uninitialized shelf initially sets its shelf ID code to a default value of all ones. To locate any uninitialized shelf, the master transmits a 'discovery' or 'who are you?' packet, referenced above, in which both the address and ID fields of the packet are set to all ones. The manner in which the expansion shelves treat this packet is unique, as one of the rules of the messaging protocol is that no shelf is allowed to decrement an address field of all ones.

Since any uninitialized expansion shelf will have set its shelf ID code set to a default value of all ones, then, in response to receiving a 'discovery' packet from the master, the first uninitialized shelf in the downstream direction from the master will detect a match between its all ones shelf ID code and the all ones contents of the shelf ID field in the 'discovery' packet, causing that uninitialized shelf to capture the 'discovery' packet. The uninitialized shelf responds to the 'discovery' packet by sending back a discovery reply packet to the master. Since the uninitialized shelf is sourcing a packet in the upstream direction, it will set the shelf address field to a value of one, as described above. In addition, since it has not yet been assigned a shelf ID code from the master, the replying shelf inserts its default ID code of all ones into the shelf ID field of the reply packet.

As the discovery reply packet is transmitted in the upstream direction to the master shelf, any intermediate shelf prior to the master will increment the packet's shelf address field by a value of one and pass the packet towards the master shelf. Upon receipt of the discovery reply packet from the uninitialized shelf, the master will know how far away the uninitialized shelf is by the contents of the shelf address field. Since the location of the uninitialized expansion shelf relative to the master shelf is now known, the master is able to initialize the expansion shelf, assigning it a shelf ID code.

For this purpose, the master will transmit an 'assign shelf ID' packet, whose shelf address field has a value corresponding to the contents of the shelf address field in the discovery reply packet which the master shelf received from the uninitialized shelf. The value of the 'assign shelf ID' packet's shelf ID field is quasi-arbitrary but, from a practical standpoint, may be chosen to match the shelf's physical address. In response to the receipt of the 'assign ID' packet from the master, the addressed shelf replaces its default shelf ID code value of all ones with its newly assigned shelf ID value for use in future communications with the master. It then sends a reply packet back to the master, in which the shelf address field is set to a value of one, and the shelf ID field has the value assigned to it by the master. As the reply packet is transmitted in the upstream direction to the master shelf, any intermediate shelf prior to the master will increment the packet's shelf address field by a value of one and pass the packet towards the master shelf. Upon receipt of the discovery reply packet from the uninitialized shelf, the master will know that a previously uninitialized shelf is now properly initialized. This completes the initialization procedure for that shelf.

If any other shelf is uninitialized, the master will again transmit a 'discovery' packet down the chain of expansion shelves. As noted above, only an uninitialized shelf awaiting initialization by the master will have its ID code set to all ones, so that only an uninitialized shelf will respond to a 'discovery' packet. It may be recalled that the shelf provisioning protocol of the present invention is such that no expansion shelf is allowed to decrement the all ones address field of a 'discovery' packet. This ensures that the master's 'discovery' packet will be relayed by respective initialized shelves unmodified until the packet reaches an uninitialized shelf and causes the routine described above to be carried out for that shelf. The master will know that all expansion shelves of the multi channel bank system have been initialized, when no response is received to a 'discovery' packet. The master may periodically issue a 'discovery' packet to find any new shelves, as well as shelves that may have reset themselves.

Because the DSLAM system is formed of a master shelf containing a master channel bank and some number of expansion shelves containing expansion channel banks that are connected together in a daisy chain manner, the possibility of a shelf becoming disconnected and then reconnected into a different order in the daisy chain sequence is relatively high. The use of a variable shelf address field and a fixed shelf ID field in the packet header enables the master shelf to determine if and where an expansion shelf has been moved. In fact, the communication and address protocol methodology of the invention allows all the shelves to be disconnected and shuffled to new locations; the master shelf is still able to keep up with their new locations through their shelf ID codes. When a replacement shelf is reinserted into the location of a remove shelf, which may be its own or another, the newly inserted shelf will go through the shelf initialization routine described above, allowing the master to adjust back to the old shelf locations. The master shelf retains an expansion shelf's location in EEPROM, so that after a power cycle, the master will be able to promptly reconstruct a shuffled stack of expansion shelves with their corresponding shelf IDs.

DETAILED DESCRIPTION

Figure 1:
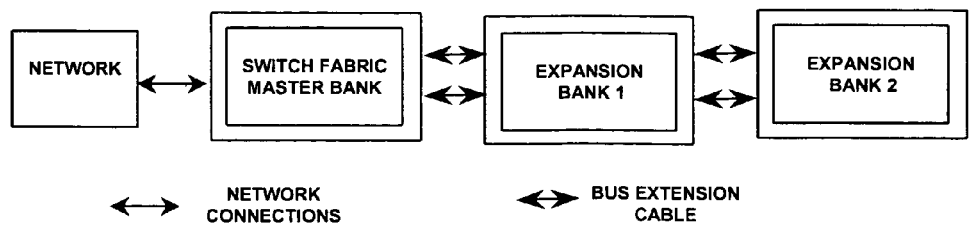
FIG. 1 diagrammatically illustrates a conventional 'bus extension' configured channel bank expansion architecture in which the physical length of the backplane bus of a channel bank is increased by means of a bus extension cable, so as to allow more channel banks to be daisy chain-connected to the bus.
Figure 2:
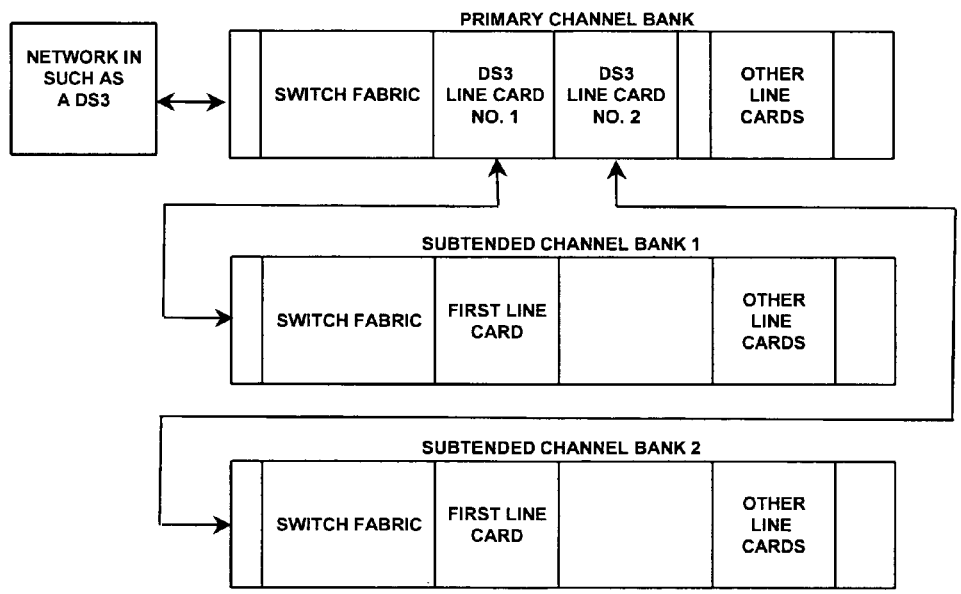
FIG. 2 diagrammatically illustrates a convention line card-usurping subtended channel bank architecture, in which multiple line card slots of a master channel bank are usurped by channel bank expansion cards, respective ones of which are linked to associated subtended channel banks.

Before detailing the single switch-fabric based, multi-channel bank architecture in accordance with the present invention, it should be observed that the invention resides primarily in a prescribed arrangement of conventional digital communication circuits and components and attendant supervisory communications microprocessor circuitry, as well as application software therefor, that controls the operations of such circuits and components. In a practical implementation that facilitates its incorporation into commercially available digital telecommunication transceiver equipment, the inventive arrangement is preferably implemented using field programmable gate array (FPGA)-configured and application specific integrated circuit (ASIC) chip sets. In a hardware implementation of such chip sets, digital ASICs are preferred.

Consequently, the configuration of such subsystems and components and the manner in which they may be interfaced with both serial and parallel telecommunication channels have, for the most part, been shown in the drawings by readily understandable block diagrams, and associated flow charts, which show only those specific details that are pertinent to the present invention, so as not to obscure the disclosure with details which will be readily apparent to those skilled in the art having the benefit of the description herein. Thus, the block diagrams and flow diagrams are primarily intended to show the major components of the invention in convenient functional groupings, whereby the present invention may be more readily understood.

Figure 3:
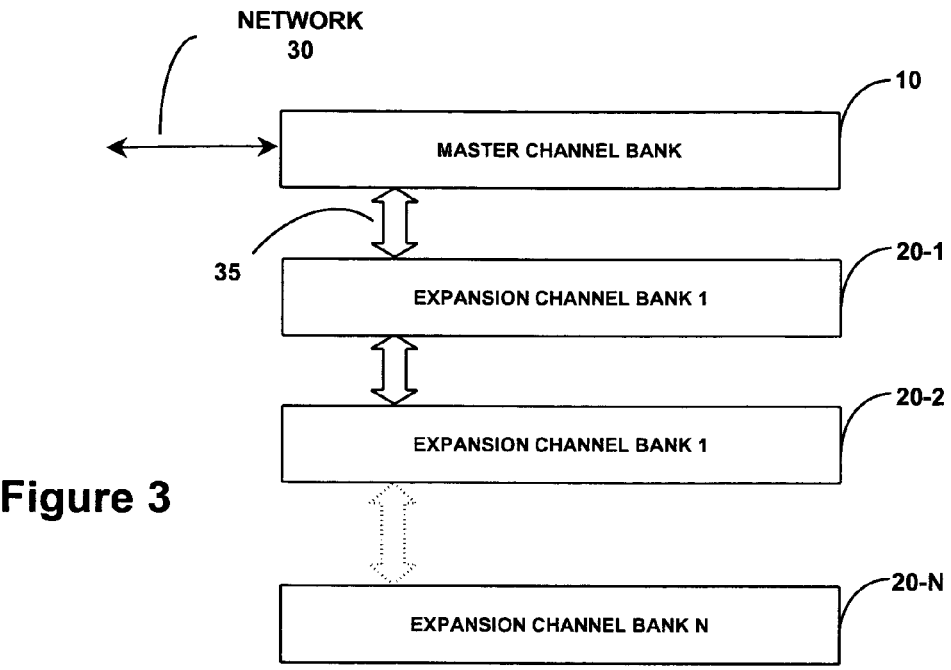
FIG. 3 is a reduced complexity block diagram of a single switch-fabric based, multi-channel bank DSLAM system architecture of the present invention.

Attention is now directed to FIG. 3, which is a reduced complexity block diagram of a single switch-fabric based, multi-channel bank DSLAM system architecture of the present invention. As shown in FIG. 3, the system includes an uppermost or top (as viewed in the drawing) equipment shelf (master shelf) for holding a master channel bank 10 and one or more downstream auxiliary or expansion equipment shelves for holding expansion channel banks 20-1, 20-2, . . . , 20N. The master channel bank 10 serves as the system's primary communication and control device, and contains the switch fabric through which all communications between an external network 30, such as an OC3 or DS3 network operating at 44.736 Mbps, and line card ports of the various channel banks (including those of the master channel bank 10 and those of the expansion channel banks 20) are effected. A communication link 35 provides communication interconnectivity among the various channel banks of the system.

Figure 4:
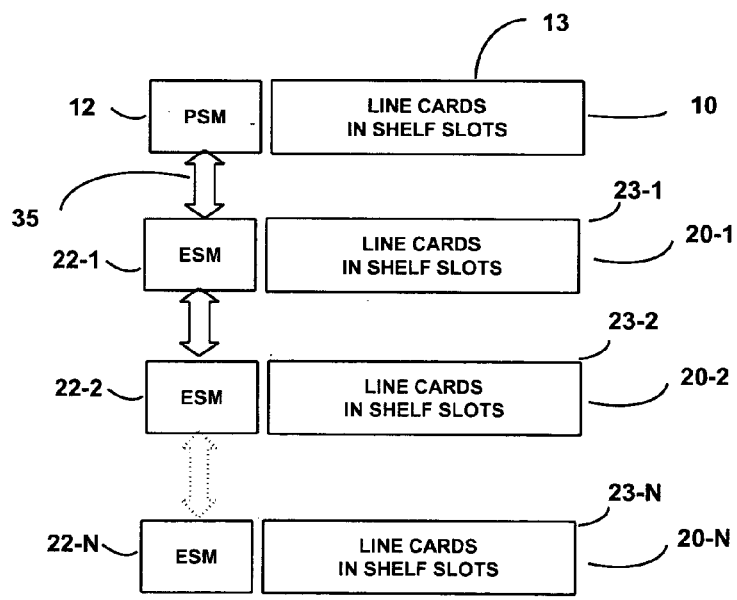
FIG. 4 shows the respective channel banks of FIG. 3 as comprising switch modules and line cards.

As diagrammatically illustrated in FIG. 4, to provide for communications between the master channel bank and the expansion channel banks, the master channel bank 10 includes a primary switch module (PSM) 12, and a set of line card 13, ports of which are coupled to customers served by the master channel bank. Similarly, the expansion channel banks include expansion switch modules (ESMs) 22-1, 22-2, . . . , 22-N, and sets of line card slots 23-1, 23-2, . . . , 23-N, ports of which are coupled to customers served by the expansion channel banks.

Figure 5:
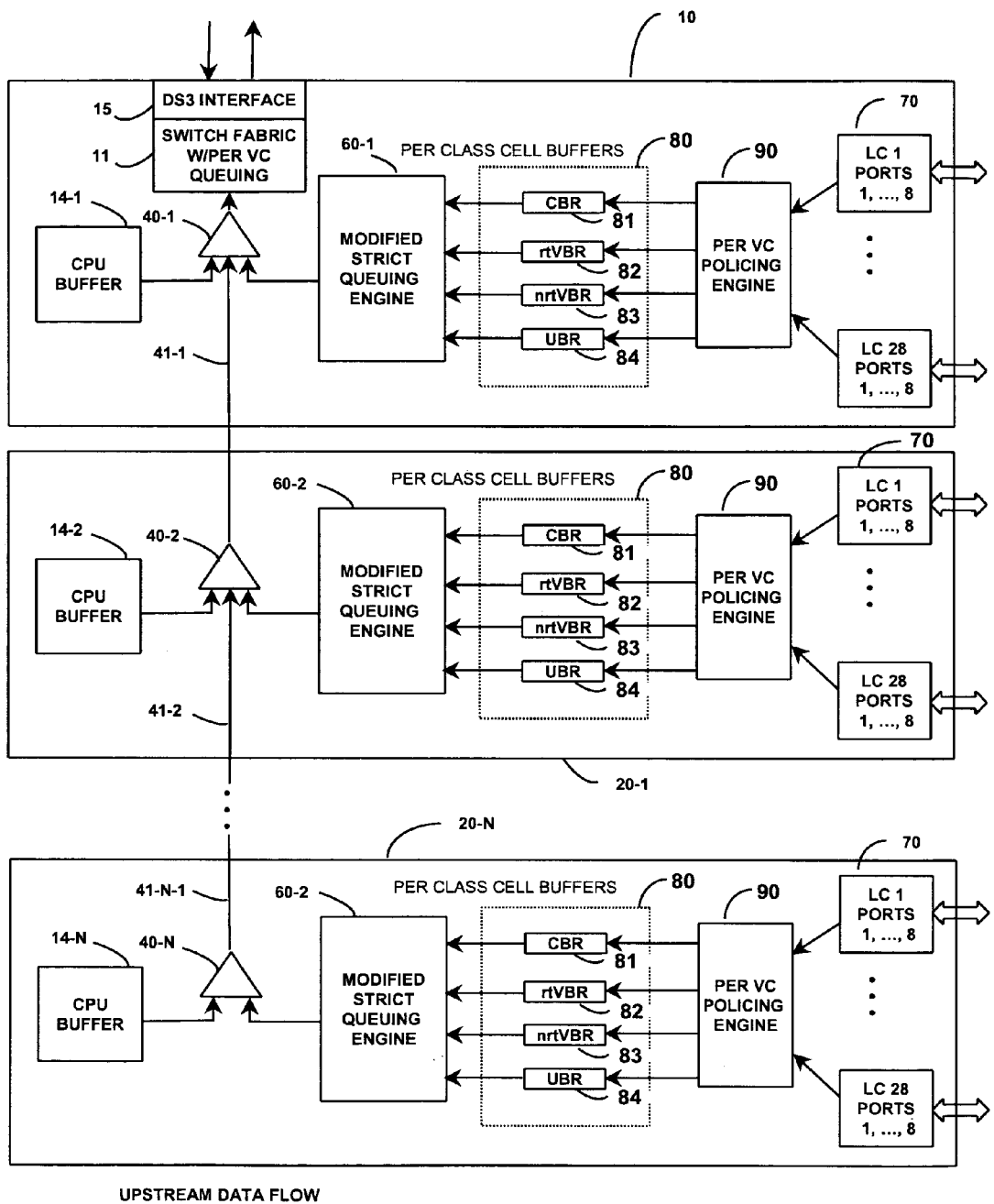
FIG. 5 shows details of the DSLAM system architecture of FIGS. 3 and 4 and their connections to an upstream communication path from the expansion channel banks to the master channel bank.

The primary switch module 12 of the master channel bank 10 is coupled with the switch fabric resident in the master and includes a set of upstream and downstream multiplexers that connect to inter-channel bank communication link 35. The upstream multiplexer, shown at 40-1 in the upstream communication diagram of FIG. 5, is used to conduct upstream communications sourced from the expansion equipment shelves. The downstream multiplexer (providing a de-multiplexing function), shown at 50-1 in the downstream communication diagram of FIG. 6, is used to conduct downstream communications from the master channel bank to the expansion channel banks.

For this purpose, the master channel bank and the expansion channel banks are linked by way of respective upstream and downstream communication links 41 and 51. The upstream link 41 is coupled with upstream multiplexers 40-2, . . . , 40-N contained in the expansion switch modules of the expansion equipment shelves, while the downstream link 51 is coupled with the downstream multiplexers 50-2, . . . , 50-N of the expansion switch modules within the expansion equipment shelves. Each of upstream and downstream communication links 41 and 51 is preferably configured as a Giga-bit Media Independent Interface (GMII). The GMII may be implemented with commercially available integrated circuits such as National Semiconductors Part DP83865.

As shown in FIG. 5, the upstream communication multiplexer 40-1 of the master channel bank has four ports. A first is coupled to a modified strict queuing engine 60-1, which receives customer data, on a virtual circuit basis, from associated line card ports of that channel bank. A second is coupled to the upstream GMII segment 41-1 from the next lowest (expansion) channel bank 20-1. A third is coupled to a CPU/buffer 14-1, and a fourth port is coupled to the switch fabric 11, which is coupled with a network interface 15.

Figure 6:
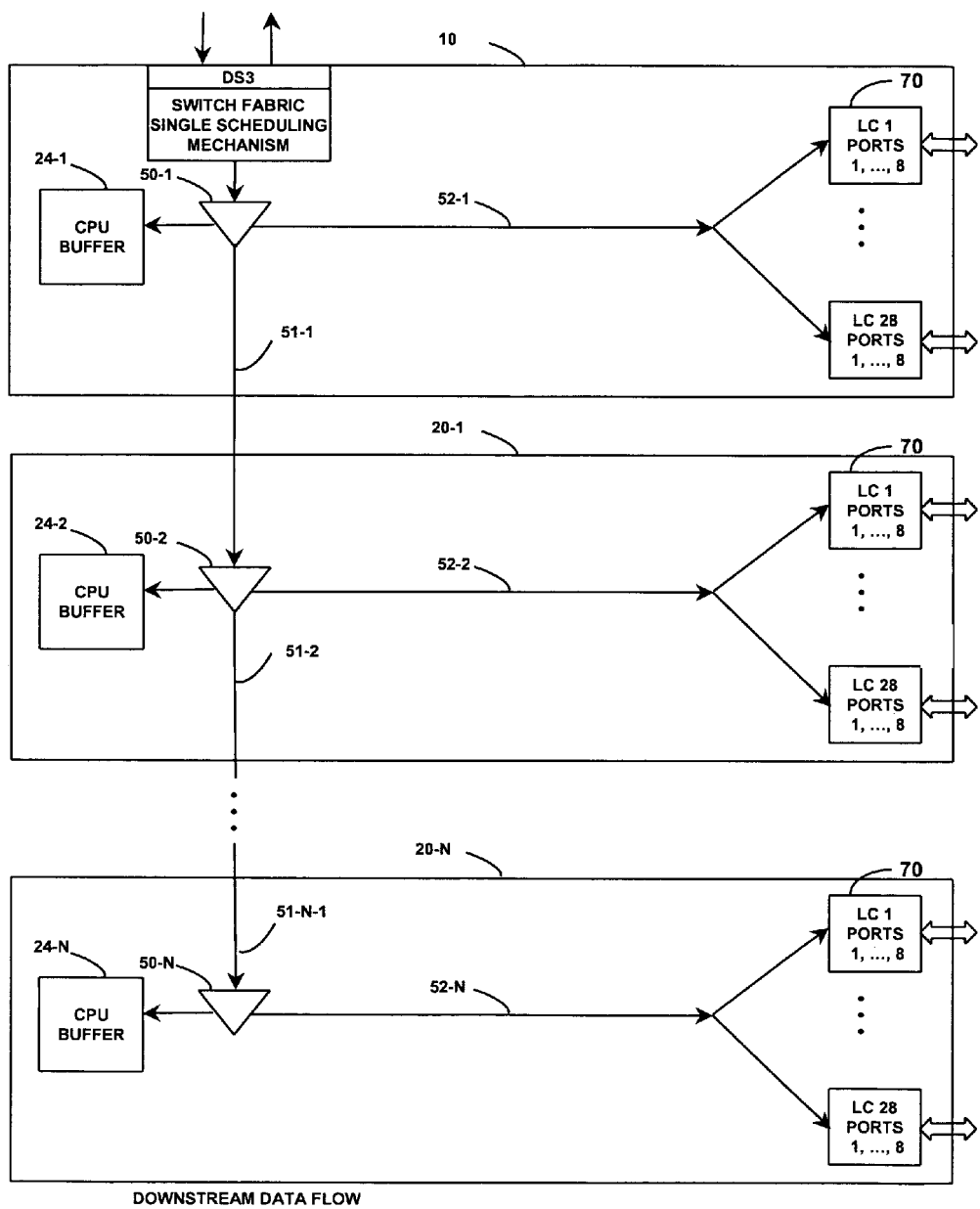
FIG. 6 shows details of the DSLAM system architecture of FIGS. 3 and 4 and their connections to a downstream communication path from the master channel bank to the expansion channel banks.

As shown in FIG. 6, the downstream communication multiplexer 50-1 of the master channel bank 10 also has four ports. A first is coupled to the master channel bank's CPU/buffer 14-1. A second is coupled to a downstream communication scheduler 18, which is coupled with the switch fabric 11. A third port is coupled to the backplane 52-1 and thereby to the line cards of the master equipment shelf. A fourth port is coupled to downstream GMII segment 51-1, which is coupled to the expansion switch module (ESM) of the immediately adjacent downstream expansion channel bank 20-1.

To effect communications with the master shelf each expansion channel bank employs an expansion switch module (ESM). A respective expansion switch module contains multiplexer circuitry through which upstream and downstream directed communications are conducted over the respective GMII upstream and GMII downstream segments 41 and 51, respectively. To this end, using the first expansion channel bank 20-1 as an example, its expansion switch module contains an upstream communication multiplexer 40-2 having four ports. A first port is coupled to receive data supplied from a modified strict queuing engine 60-2 to which customer data from associated line cards of that equipment shelf are supplied. A second port is coupled to a local CPU/buffer of that channel bank. A third port is coupled to receive data supplied via an upstream GMII segment 41-2 from the next lowest expansion shelf 20-2 (if installed). A fourth port of the upstream communication multiplexer 40-2 is coupled to the upstream GMII segment 41-1 to the next higher channel bank (here the master channel bank 10).

For downstream-directed communications, again using the first expansion channel bank 20-1 as an example, its expansion switch module contains a four port downstream communication demultiplexer 50-2. A first port of demultiplexer 50-2 is coupled to receive an input from the downstream segment 51-1 of the GMII from the next highest channel bank (which is the master channel bank 10 in the present example). A second port is coupled to that channel bank's CPU/buffer 24-1. A third port is coupled to the downstream segment 51-2 of the GMII to the next lowest channel bank (if employed), and a fourth port is coupled to the backplane 52-2 through which output data is coupled to associated ports of the line cards installed within that channel bank's backplane.

Upstream Communications

It should initially be noted that timing over the upstream GMII link 41 to the switch fabric and out to the network therefrom is readily handled by the switch fabric and the network, since all (ATM) data traffic from the various line card ports and intended for the network are temporarily stored in a switch-fabric buffer, and are controllably read out therefrom at whatever data rate the network is using. For downstream directed communications, on the other hand, communications must be scheduled and locked to network timing in order to be correct for the line card ports to the customers. The manner in which the invention makes use of the functionality of the Gigabit Ethernet transceiver circuitry installed in the downstream link will be described in a section on Downstream Communications.

As pointed out above, and as shown in FIG. 5, the switch module of each channel bank, whether it be the master channel bank 10 or one of the expansion channel banks 20, contains an upstream communication multiplexer 40, which is coupled with an upstream GMII segment 41 and is configured to receive up to three inputs. One of these inputs is coupled to a CPU/buffer 14, which stores CPU data, such as maintenance, statistics, or any other type of general data that needs to be shared between equipment shelves. As described above, a second input is coupled to an upstream GMII segment 41 from (an optional) a next lowest downstream channel bank 20. A third input is coupled to the output of a modified strict queuing engine 60.

Inputs to the modified strict queuing engine 60 are supplied from a set of cell buffers 80 having respectively different priorities or classes of service. The size of each cell buffer may be on the order of 128 Kbytes. The cell buffer set includes a constant bit rate (CBR) buffer 81 (which has the highest priority), a real time variable bit rate (rtVBR) buffer 82 (which has a priority less than buffer 81 but greater than those of buffers 83 and 84), a non-real time variable bit rate (nrtVBR) buffer 83 (which has the second lowest priority), and an undefined bit rate (UBR) buffer 84 (having the lowest priority).

The cell buffers of a respective channel bank are loaded with ATM cells, under the control of that channel bank's policing engine 90, inputs to which are supplied by line card ports of the channel bank to which customer data is coupled. One or more line card ports may be combined to provide a virtual circuit (VC). The policing engine is configured on a per VC basis and to comply with specifications published by the ITU and the ATM forum, and is operative to determine the extent to which ATM cells being supplied from a customer port conform with a prescribed set of criteria for entering the network. As will be described, cells are considered to 'conform', if their peak and sustained cell rates (and associated variances) are equal to or less than values previously agreed to by the user and the service provider; namely, they are associated with a prescribed class-of-service. Each ATM cell has a virtual path identifier and a virtual circuit identifier. The policing engine uses these 'tags' to match up with parameters provisioned by the customer and conform the ATM cells with each of a peak cell rate, corresponding to the maximum number of ATM cells that can be sent through the system within a given time interval, and a sustained cell rate, which effectively corresponds to the subscription rate. In addition, the policing engine executes a prescribed flow control algorithm that serves to optimize the transport of data in the upstream direction, so as to prevent the buffers from being overfilled.

In the unlikely, although possible, event that all of the line cards of a given channel bank attempt to upload ATM cells at the same time, a bottleneck would be created at the outflow from the cell buffers, as these buffers would not drain or be read out fast enough. To avoid this problem, the modified strict queuing engine extracts ATM cells from the buffers in accordance with a prescribed percentage of the time priority assigned to each cell buffer. As a non-limiting example, the CBR buffer 81 may be assigned 40% of the available bandwidth, the rtVBR buffer 82 may be assigned 30% of the available bandwidth, the nrtVBR buffer 83 may be assigned 20% of the available bandwidth, and the UBR buffer 84 may be assigned 10% of the available bandwidth. If any of these buffers has no data stored in it, then the available bandwidth of the remaining buffers is increased in accordance with their percentage relationships among themselves. Thus, for example, if the UBR buffer 84 is empty, there is an extra 10% of bandwidth to be divided up among the other three buffers. Based upon their bandwidth allocations relative to each other, buffer 81 would acquire an additional 4.4%, buffer 82 would acquire an additional 3.3% and buffer 83 would acquire an additional 2.2%. Using this priority of assignment formula prevents one class of service from 'hogging' the bandwidth—so that the contents of each buffer will be transmitted—yet weights bandwidth allocation in favor of the highest priority of use, so as to provide a reasonable balance among the various classes of cells being supplied to the policing engine.

As pointed out previously, the upstream data flow-controlling policing engine employed by a respective channel bank is preferably configured in the manner described in the above-referenced '086 application. As detailed in that application, the policing engine of a respective channel bank controls the rate at which information cell packets are allowed to be written into various buffers associated with respectively different classes of service to which a customer may subscribe. This data rate control is such that the flow of data cells into the buffers both conforms with subscription rates of the various line card ports, and also avoids writing cells into the buffers at a rate faster than the rate at which the buffers are read out for uplink transport to the switch fabric and application thereby to the network.

As will be described below with reference to the flow diagram of FIG. 7, a respective policing engine examines the rate at which ATM cells are supplied to it from the VCs formed by the channel bank's line card ports, the types of cells (in particular, whether the cells are ATM Adaptation Layer 5 (AAL5) cells), and the occupancy of the buffers into which the cells are to be written. If incoming cells are being supplied to the policing engine at a rate faster than the customer's subscription rate, or if the buffer for those cells begins to fill up, the policing engine will begin to controllably discard incoming cells (i.e. it prevents incoming cells from being written into the buffer), in order to keep the cell flow rate at a steady and manageable level.

Figure 7:
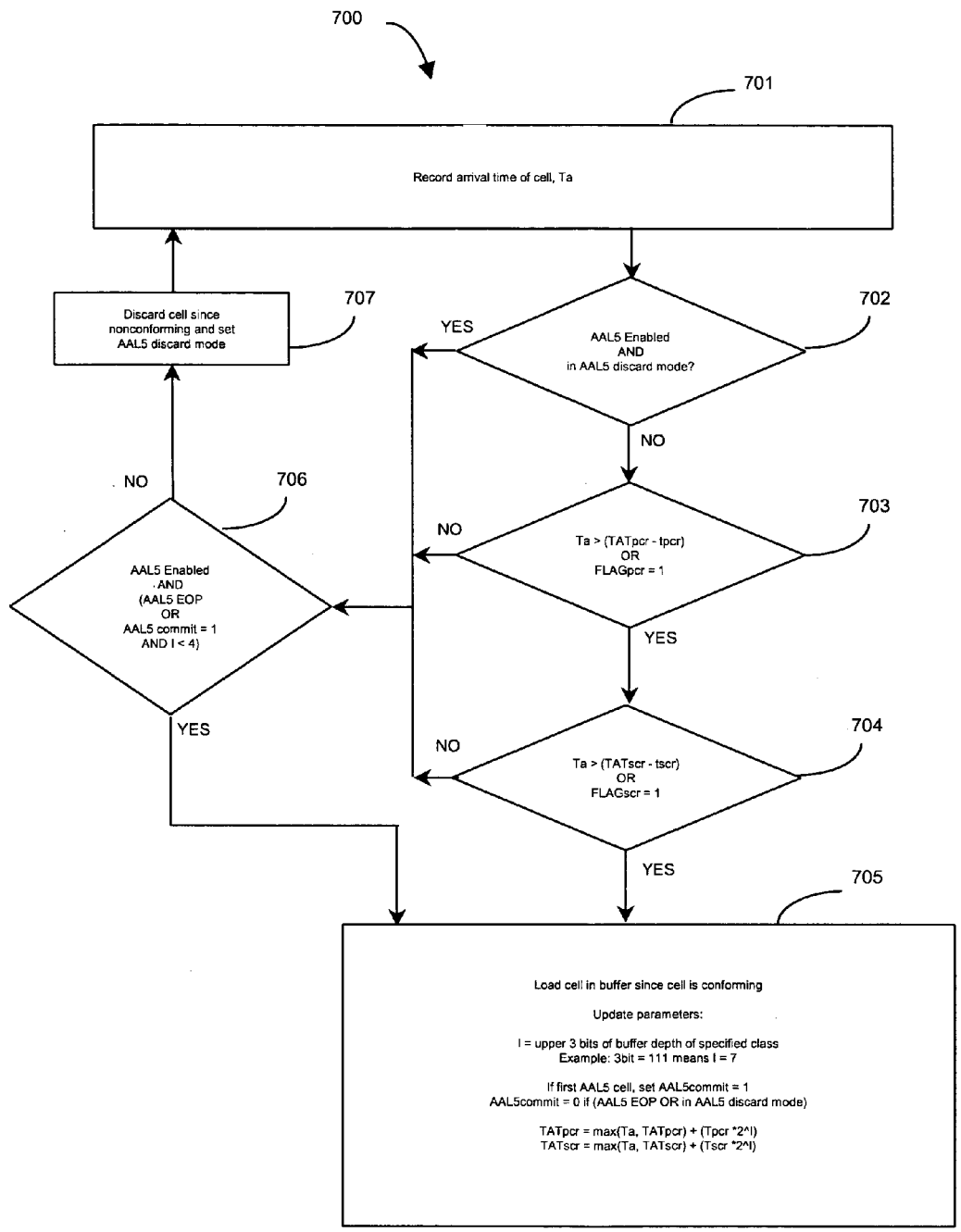
FIG. 7 is a flow chart showing the respective steps of the policing engine of FIG. 5 and is further disclosed in the '086 application.

Attention is now directed to a policing algorithm flow chart 700 of FIG. 7, wherein respective steps of the policing engine in accordance with the invention disclosed in the above-referenced '086 application are shown. The initial task of the policing engine is to note the time of arrival (Ta) at which a respective cell is presented to it. Cell arrival time is monitored by keeping track of the contents of a pair of counters, which are continuously incremented by a clock signal having a frequency associated with the subscription data rate of the incoming cells. One of these counters, CNTRpcr, is associated with peak cell rate (pcr), and the other counter, CNTRscr, is associated with sustained cell rate (scr). As each counter is incremented, its count value Ta at the time of arrival of a cell is compared with a count value associated with a Theoretical Arrival Time (TATpcr or TATscr), at which the next cell following a previously received cell is 'expected' to arrive, based upon a relationship with the subscription rate for those cells.

In general, as long as the count value Ta is greater than or equal to the TAT count value, indicating that the newly arriving cell is supplied to the policing engine at a time later than the theoretical arrival time, it is inferred that the cell has a transport rate that does not effectively violate the subscription data rate, so that the cell is considered 'conforming'. On the other hand, if the count value Ta is less than the TAT count value, it is inferred that the newly arriving cell is supplied at a data rate that is greater than the subscription rate, and is therefore considered to be 'non-conforming'. Conforming cells are written into their associated buffer, while non-conforming cells are dropped. Moreover, once a cell has been determined to be conforming, TAT values associated with the peak cell rate and the sustained cell rate are updated in accordance with algorithms that use both the current TAT count value and the Ta count value.

More particularly, at a first step 701, at the arrival of a cell, the count values of CNTRpcr and CNTRscr are stored as an arrival time count value Ta. The routine then transitions to AAL5 query step 702. In this step, a determination is made as to whether the incoming cell is an AAL5 cell and, if so, whether the policing engine routine is in AAL5 'discard' mode. The policing engine will have been placed in AAL5 discard mode, if analysis of a previously received cell of a currently received AAL5 packet has resulted in that previous cell being non-conforming. Once an AAL5 cell has been determined to be non-conforming, all remaining cells of the packet, save the last or end of packet (EOP) cell, are discarded. For purposes of the present description, AAL5 cell processing in steps 702 and 706, to be detailed below, will be temporarily ignored, so that the answer to query step 702 is presumed to be NO, so that the routine transitions to peak cell rate query step 703.

The peak cell rate query step 703 is used to accommodate 'bursty' instances of data flow, wherein the data rate of a channel temporarily exceeds a sustained data rate which effectively corresponds to its subscription rate, it being recalled that the purpose of the policing engine is to optimize data flow over all channels to the network. As long as the length of time that a channel is supplying data at a cell rate in excess of its subscription rate is relatively short, the policing engine will attempt to accommodate it. However, if incoming data is supplied at a relatively high data rate for more than relatively short burst, it will be determined to be non-conforming and discarded.

To this end, in query step 703, the time-of-arrival count value Ta derived in step 701 is compared with a peak cell rate (pcr) theoretical arrival time count value TATpcr. TATpcr is a count value stored in the TATpcr counter and updated by the policing algorithm 700 as will be shown (step 705). In general, if the count value Ta of the arriving cell is at least as large as the TATpcr count value, it is inferred that the data rate of the arriving cell is less than subscribed peak cell rate, and the cell is considered to be potentially conforming.

For purposes of providing an illustrative example, let it be assumed that the peak rate of arrival of incoming cells corresponds to TAT count values having successive differences of 50, such as the count values 50, 100, 150, 200 and so on. In reality, however, it can reasonably be expected that the cell arrival rate will be offset slightly from the peak data rate, so that cells may arrive at count values such as 49, 101, 153 and the like, rather than at the precise TATpcr count values of 50, 100, 150, etc. The first cell in the sequence of this example has an arrival time count value of 49, which is less than the peak cell rate TAT count value of 50. On this basis alone, the data rate of the first arriving cell exceeds the peak cell rate, apparently making this cell non-conforming. However, it can also be seen that the overall arrival rate of this and subsequent cells is relatively close to that of the peak cell rate theoretical arrival times, so that cell arrival times 'generally' appear to conform with peak cell rate criteria.

To accommodate for anomalies in the data flow path that may give rise to time-of-arrival differences from the theoretical arrival times, a prescribed tolerance value tpcr is subtracted from each of the peak cell rate count values in the course of making the Ta vs. TATpcr comparison. For this purpose, a relatively small peak cell rate tolerance value tpcr is subtracted from the TATpcr count value. In the above example of the successive TAT values, 50, 100, 150, 200 and so, a variance or offset value such as 5 may be used, to realize 'modified' TAT values 45, 95, 145, 195, and so on. This means that the arrival time count value Ta=49 for the first cell is greater than TATpcr (50)–tpcr (5)=45, so that this cell is potentially conforming (pending further processing in subsequent query step 704 to determine whether the cell rate satisfies sustained cell rate criteria). Therefore, as long as the count value Ta is greater than or equal to the TATpcr count value (less a prescribed peak cell rate tolerance tpcr), it may be inferred that the incoming cell is effectively being supplied at a rate that is no greater than a prescribed peak cell rate, so that the cell is considered to be potentially conforming, and the output of query step 703 is YES.

In addition to determining whether the cell arrival time count satisfies a peak cell rate theoretical arrival time count, step 703 determines whether the CNTRpcr counter has expired, namely whether an 'expired' flag (FLAGpcr=1) has been set for the counter. The purpose of comparing the actual arrival time of a cell with an associated theoretical arrival time for that cell is to determine whether the cell is arriving reasonably close to its expected arrive time. To quantify cell arrival times relative to a theoretical arrival time (for both the peak cell rates and the sustained cell rates), a determination may be made as to whether 1) the cell has arrived reasonably close to or in the vicinity of the theoretical arrival time, 2) the cell has arrived considerably later than the theoretical arrival time, or 3) the cell has arrived considerably earlier than the theoretical arrival time.

To quantify these three intervals for peak cell rate counter, CNTRpcr, the counter may be divided into three count zones. However, as a two bit digital code for representing three count zones can also be used to represent four count zones, the range of CNTRpcr is preferably divided up into four successively contiguous equal count zones. These zones are shown in the circular timing count diagram of FIG. 8 as comprising: a first count zone T21, which extends between 0 and a count value R; a second count zone T22, which extends between count value R and a count value 2R; a third count zone T23, which extends between count value 2R and count value 3R; and a fourth count zone T24, which extends between count value 3R and an end count value 4R (which wraps around to 0).

As pointed out earlier, whether or not an expired flag is to be set for a particular cell is determined by examining in which count zone the actual time of arrival of that cell occurs, relative to the count zone containing its theoretical time of arrival. Pursuant to the invention, an 'expired' flag is set, if the count zone in which the cell actually arrives is more than one count zone ahead of the count zone containing the theoretical arrival time.

Figure 8:
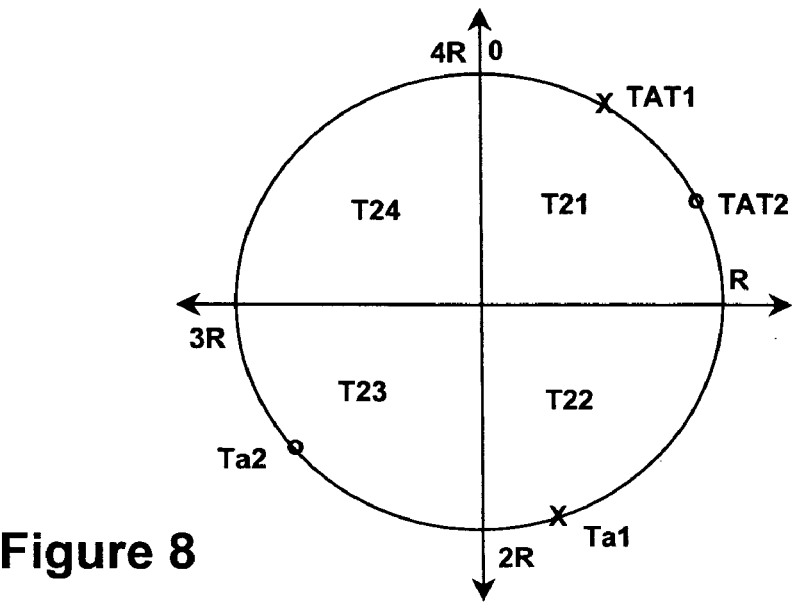
FIG. 8 diagrammatically illustrates the subdivision of the count range of a respective TAT counter into four successively contiguous time zones.

As a non-limiting example, FIG. 8 shows a $TAT_1$ occurring in time zone T21, with the actual arrival time Ta1, of the cell occurring in time zone T22. Since the time zone T22 in which Ta1 occurs is not separated from the time zone T21 in which $TAT_1$ occurs, no 'expired' flag is set, FLAFprc=0. On the other hand, FIG. 8 also shows a $TAT_2$ occurring in time zone T21, whereas the actual arrival time, Ta2, of the cell does not occur until time zone T23. Since the time zone T23, in which the Ta2 occurs, is separated from the time zone T1 in which $TAT_2$ occurs by time zone T22 therebetween, an 'expired' flag is set (immediately upon the counter reaching the value 2R), i.e. FLAGpcr=1. It will be appreciated that the 'expired' flag assertion routine also serves to prevent a roll-over or wrap-around of the counter to a count value that is less than the TATpcr count from erroneously indicating that the data rate is in excess of the allowed peak cell rate.

For the above example, let it be assumed that the current cell, which should have arrived at a TATpcr counter value on the order of 49, is extremely delayed and does not arrive until just after the counter has counted up to its maximum value and rolled over, so that the Ta count value is a relatively small value (e.g., 40), rather than the value of 49 it would have had if the cell had arrived as described above. In this case, the value of Ta (40) is less than TATpcr (50)−tpcr (5)=45, so that the cell appears to be non-conforming. In accordance with the alternative test of step 703, however, this incorrect result is avoided by having the expired flag (FLAGpcr=1) take precedence, superseding the incorrect indication that the value of Ta is less than (TATpcr−tpcr). For the parameters of the present example, the answer to query step 703 is YES, so that the routine transitions to sustained cell rate query step 704. If the answer to query step 703 had been NO, the routine would transition to discard step 707 since the cell is nonconforming and not AAL5 enabled.

Sustained cell rate query step 704 is the same as step 703, except that the incoming cell's time-of-arrival count value Ta is compared with a sustained cell rate (scr) theoretical arrival time count value TATscr. The sustained cell rate theoretical arrival time count value is higher than the peak cell rate count, and serves to more closely match the subscription data rate, to which the TATscr counter, CNTRscr, should be incremented at the time of arrival of the current cell of interest once a sustained cell rate has been realized. For the parameters of the above example, let it be assumed that the incoming cells, if they were arriving at exactly at the subscription data rate, would arrive periodically at count difference values of 100, such as at the count values 100, 200, 300 and so on. It may be noted that the larger count values are due to the fact that the data rate of interest is the sustained data rate, which more closely tracks the subscription rate and is therefore slower than the peak cell rate.

As in the case of the peak cell rate, it can be expected that the cell arrival rate may slightly differ from the sustained cell rate, so that cells arrive at count values that do not exactly match the sustained cell rate. Again, to accommodate for anomalies in the data flow path that give rise to such time-of-arrival offsets, a prescribed sustained cell rate tolerance or variance tscr is subtracted from the sustained rate count value with which the arrival time count Ta is compared. As was the case with the peak cell rate comparison of step 703, as long as the count value Ta is greater than or equal to the TATscr count value less the sustained cell rate tolerance tscr, it is inferred that the incoming cell is effectively being supplied at a rate than is no greater than the sustained cell rate. For the present example, the answer to query step 704 is assumed to YES—the cell is considered to be conforming, so that the routine transitions to conforming cell update step 705.

In addition to comparing the cell arrival time count with the sustained cell rate theoretical arrival time count, step 704 also determines whether operation of the TATscr counter has caused an 'expired' flag (FLAGscr=1) to be asserted, as described above with reference to FIG. 8. As was the case with peak cell rate comparison step 703, this serves to prevent the event of a counter roll-over from erroneously indicating that the sustained data rate is in excess of its subscription rate. In step 704, this incorrect result is avoided by having the counter expiration supersede the incorrect indication that the arrival time count Ta is less than TATscr−tscr. Therefore, if either criterion in step 704 is satisfied, the routine transitions to conforming cell update step 705.

In step 705, the routine updates the values of TATpcr and TATscr. In addition, if AAL5 processing is involved, it sets prescribed flags, described below. For the present, with AAL5 processing is temporarily ignored only the updating of the TAT values will be described. Each TAT value (TATpcr and TAT scr) is updated by selecting the larger or maximum of the current Ta count value and the TAT value, and summing that larger/maximum value with a prescribed constant, whose value depends upon the available depth of the buffer into which the cell is to be written. Namely, $$TATpcr = \max(Ta, TATpcr) + (Tpcr * 2^T), \text{ and}$$

$$TATscr = \max(Ta, TATscr) + (Tscr * 2^T),$$

where Tpcr and Tscr are constants associated with the subscription rate, and I is the decimal equivalent of a multibit binary number that represents the available depth of the buffer. Using a three bit number for I, as a non-limiting example, if the buffer is less than one-eighth full, I=000 or 0, and if the buffer is at least seven-eighths full, I=111 or 7.

From the relationships for TATpcr and TATscr set forth above, it can be seen that, when a TAT value is updated, its value tends to increase toward the subscription rate. Over the course of several or more iterations from an initial, relatively small value to a much larger value, this has the effect of causing the police engine to discard cells that are supplied more frequently than the subscription rate, and tends to force the incoming cell traffic to conform with the sustained cell rate.

The exponential term in the above equations takes into account how full the cell buffer has become. When the cell occupancy of the buffer is relatively small, the value of I, in turn, is relatively small (e.g., 0)—so that the constant times two raised to the Ith power is simply the constant. On the other hand, as the available storage depth of the cell buffer decreases, the value of I increases, causing the constant to be multiplied by an exponentially larger number (larger power of 2). This has the effect of significantly increasing the value of TAT, so that more and more cells arriving at the policing engine will be discarded, rather than being forwarded to the buffer. This 'throttling' of the incoming cells allows the cell occupancy of the buffer to be reduced as the cells are read out of the buffer. Then, as the cell occupancy of the buffer is reduced, the value of I decreases, thereby reducing the value of TAT, allowing more cells to be passed to the buffer.

As pointed out above, in addition to updating the values of TATpcr and TATscr for evaluating the next incoming cell, step 705 also raises prescribed flags associated with an AAL5 packet, if the conforming cell is that of an AAL5 frame. In particular, if the conforming cell is the first cell of an AAL5 frame, step 705 sets an AAL5commit flag to a '1'. The purpose of this operation is to cause the policing engine, once it has begun accepting cells of an AAL5 packet for storage in the buffer, to be 'committed' to passing the remaining AAL5 cells of the packet into the buffer (regardless of whether or not the remaining AAL5 cells are conforming), as long as the cell occupancy of the buffer is no more than a prescribed value (e.g., half) associated with sufficient storage capacity to accommodate the entirety of the AAL5 packet. On the other hand, if the policing engine has begun discarding AAL5 cells, or if the AAL5 cell of interest is an end of packet (EOP) cell, step 705 sets the AAL5commit flag to a '0'. The purpose of this operation is to avoid unnecessary processing of AAL5 cells, once it has been determined that the packet is to be discarded. When it has completed the operations of step 705, the routine transitions back to step 701. The manner of processing AAL5 cells will now be described.

When a cell is received and its time of arrival Ta is stored in step 701, the routine transitions to AAL5 query step 702, as described above. In step 702, a determination is made as to whether the incoming cell is an AAL5 cell (AAL5 enabled) and, if so, whether the routine is in AAL5 'discard' mode. Once it has discarded an AAL5 cell and thereby been placed in AAL5 discard mode, the policing engine will proceed to immediately discard all subsequent AAL5 cells (save the end of packet AAL5 cell) as they are received, so as avoid using its bandwidth for unnecessary processing of subsequent cells of the AAL5 frame, which becomes invalid whenever a cell thereof is discarded. This decision is associated with a YES answer to query step 702, causing the routine to branch to step 706. If, on the other hand, the incoming packet is an AAL5 packet and none of its cells has yet been discarded, the answer to query step 702 is NO, so that the routine transitions to step 703, and performs TAT processing of the AAL5 cell in the manner described above. If the answer to either of steps 703 and 704 is NO—indicating that the AAL5 cell is non-conforming—the routine branches to query step 706.

In query step 706, a determination is made as to whether the AAL5 cell of interest is the last cell in the AAL5 packet, or whether the AAL5 commit flag has been set to a '1', and the available capacity of the buffer is sufficient to accommodate a complete AAL5 packet. If either of these conditions is true (the answer to query step 706 is YES), the cell is considered to be conforming, and the routine branches to step 705.

The purpose of the first determination in query step 706 (whether the AAL5 cell is the last cell in the AAL5 packet) is to let the policing engine know where the AAL5 packet ends, so that it may update the TAT values in preparation for receiving a new packet. The purpose of the second determination of step 706, namely, whether the AAL5 commit flag has been set to a '1', and the whether the available capacity of the buffer is sufficient to store a complete AAL5 packet, is to commit the policing engine, once it has begun passing AAL5 cells to the buffer (which implies that the first AAL5 cell is a conforming cell), to writing all of the remaining AAL5 cells of the packet into the buffer, as long as the available storage capacity of the buffer is sufficient to accommodate the entirety of an AAL5 packet.

Assuming that the buffer has sufficient capacity to store two maximum length AAL5 frames, and using the parameters of the above example, where the available storage capacity of the buffer is represented by a three bit number I, then as long as I is less than 100 (4), it is inferred that the buffer can accommodate another complete AAL5 frame. If the answer to either of the inquiries of step 706 is NO, the routine transitions to step 707, wherein the cell is declared non-conforming and is discarded or dropped. Once a cell is discarded in step 707, the routine returns to step 701, to await the arrival of a new cell.

As pointed out briefly above, the rate at which the output of a modified strict queuing engine of a respective channel bank is coupled to its associated upstream multiplexer is selectable in accordance with bandwidth limitations of the system, in particular the combined upstream data rate at the input to the switch fabric. In accordance with the invention, for purposes of 'fairness' among all of the equipment shelves contained in the system, the data rate limitation is maintained to be the same for each channel bank, regardless of changes in system configuration. The data rate is readily provisioned by the supervisory control processor of the master channel bank among the various channel banks of the system due to the fact that, irrespective of changes to the system, the master shelf is able to dynamically track how many shelves make up the system and where those (expansion) shelves are located relative to the master.

For example, if the switch fabric can accept data at a rate up to 360 Mbps, then the aggregate of all of the equipment shelves (master plus all expansion shelves) cannot exceed 360 Mbps. This means that a four shelf system (one master and three expansion shelves) must be limited to providing no more than 90 Mbps per shelf, even though a given shelf's upstream multiplexer may have the capability of handling 655 Mbps or more.

The manner in which the master channel bank learns of and handles changes in system configuration, such as the addition, removal or replacement of individual expansion shelves, will be described below with reference to FIGS. 15-22. Once it knows the number of shelves in the system, the master channel bank's processor divides the available bandwidth by the number of channel banks to realize the available bandwidth per channel bank, and proceeds to download to each channel bank's control processor the appropriate bandwidth usage parameters that result in the same bandwidth allocation for each channel bank. Because the bandwidth of a respective multiplexer is Gigabit capable, and its inputs are not proximate to its Gb capacity, each multiplexer is effectively a non-blocking interface.

As noted earlier, in accordance with the present invention, only the master channel bank contains the system's switch fabric. This is in contrast to conventional multiple channel bank architectures that place a switch fabric on each shelf. As a non-limiting example, the switch fabric installed in the master channel bank may comprise a commercially available switch fabric, such as a dual chip set (Atlas and Apex chip set) switch fabric provided by PMC Sierra. Although this particular switch fabric chip set happens to contain a policing engine, that policing engine is not used (i.e., it is disabled) in the system architecture of the present invention, since it is not capable of handling the volume of data traffic encountered by the invention. Instead, the present invention distributes plural ones of the policing engine described above among the respective equipment shelves. This allows the data flow to the switch fabric to be within acceptable parameters and maintains data flow fairness among the shelves.

Downstream Communications

As described previously, data transmitted in the downstream direction is one of two types: 1—CPU data (such as shelf-provisioning parameters), and 2—data sourced from the network and intended for a delivery by a line card port to a customer. In order to be properly delivered to a customer, data transmissions along the downstream GMII segments must be locked to network timing, and they must be scheduled. In order to lock downlink transmissions to network timing, advantage is taken of clock recovery functionality that is built into the Gigabit Ethernet transceiver circuitry to which downstream GMII segments 51-$i$ are connected.

Figure 9:
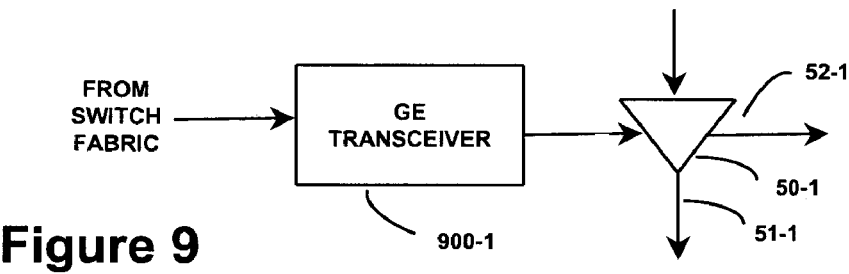
FIG. 9 is a block diagram of a portion of the communication path through the master shelf, depicting a Gigabit Ethernet transceiver installed immediately upstream of a downstream traffic multiplexer.
Figure 10:
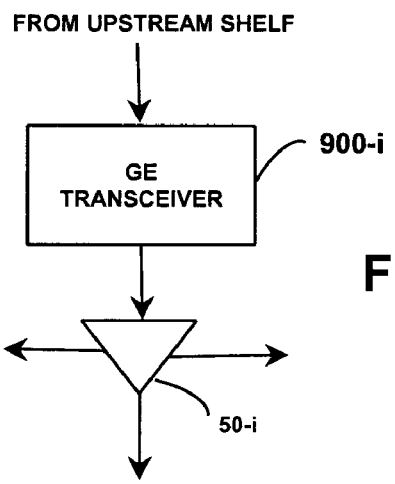
FIG. 10 is a block diagram of a portion of the downstream communication path from the master shelf through an expansion shelf, depicting a Gigabit Ethernet transceiver installed immediately upstream of a downstream traffic multiplexer.

As shown in FIG. 9, immediately upstream of the multiplexer 50-1 in the master channel bank, a Gigabit Ethernet transceiver 900-1 is installed. Similarly, as shown in FIG. 10, a Gigabit Ethernet transceiver 900-$i$ is installed immediately upstream of a respective multiplexer 50-$i$ within an expansion channel bank 20-$i$. As a non-limiting example, each Gigabit Ethernet transceiver may comprise a commercially available transceiver of the type manufactured by National SemiConductor. Advantageously, this type of Gigabit Ethernet transceiver has a data port and a clock recovery port, which is coupled with a phase locked loop (PLL), the PLL producing a transmit clock that is substantially free of jitter and locked to network timing. The clock output of the PLL is used as the transmission clock for a transmitter section of the transceiver, to which data intended for transmission over the next downstream Gigabit Ethernet segment to the next downstream shelf is coupled. Interconnecting the respective GMII segments in this manner provides locked to network timing-synchronization of the daisy-chaining of the downstream communication links among successive equipment shelves.

In addition to being locked to network timing, customer-destined data communications must also be scheduled. Namely, once it has been buffered from the network into switch fabric buffer circuitry, data destined for a customer port is thereafter read out from its switch fabric buffer and transmitted to that port at a time that is specified by a scheduling mechanism resident in the master channel bank. As noted previously, and diagrammatically shown in FIG. 11, the switch fabric contains a plurality of ATM cell buffers 110-1, 110-2, 110-3, ..., 110-K, respective ones of which are associated with the K ports of the line cards of the various equipment shelves. A typical channel bank having 28 line card slots and 8 ports per line card translates into 224 ports per shelf that are serviced by the scheduler. In a system having a master channel bank and three expansion shelves (for a total of four shelves), for example, the scheduler is configured to manage downstream ATM cell transmissions to a total of K=896 ports.

Figure 11:
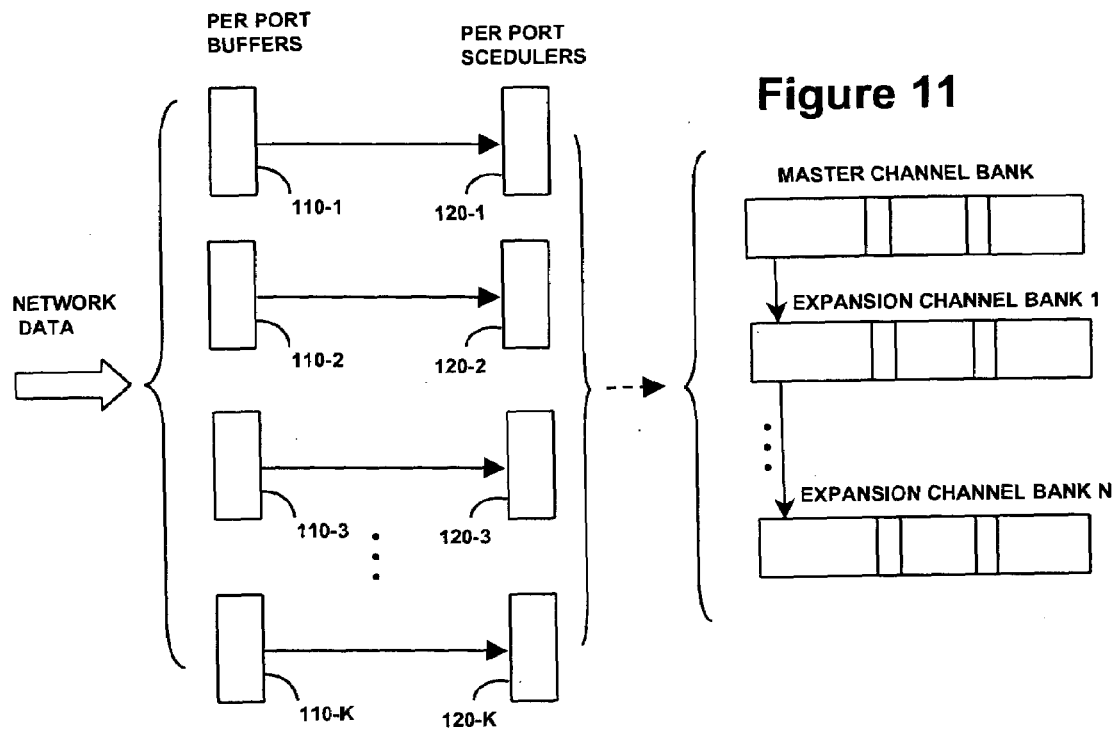
FIG. 11 is a reduced complexity illustration of a plurality of switch fabric cell buffers and associated 'per port' data transmission schedulers of a downstream data transmission scheduler subsystem in accordance with the invention disclosed in the '095 application.

The scheduling mechanism employed in the DSLAM system architecture of the present invention is preferably configured in the manner described in the above-referenced '095 application. As shown in FIG. 11 and as described in the '095 application, respectively associated with the N 'per port' ATM cell buffers 110-1, ..., 110-K is an associated set of K 'per port' schedulers 120-1, 120-2, 120-3, ..., 120-K. These schedulers have the task of reading out ATM cells stored in the buffers 110 for delivery to destination parts of the line cards of the various equipment shelves. As will be described, a principal component of a respective 'per port' scheduler is an accumulator, the contents of which are successively incremented by a 'per port' scheduler clock and are monitored by associated control circuitry in order to specify the time at which a buttered ATM cell is read out for transmission to its destination port.

Figure 12:
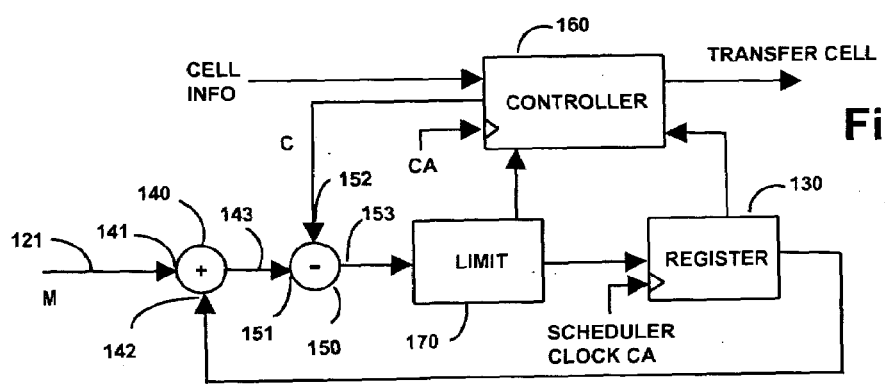
FIG. 12 is a functional block diagram of a respective per port data transmission scheduler.

For this purpose, each 'per port' scheduler is configured in the manner shown in FIG. 12 as comprising an input port 121 to which a prescribed value M is supplied. The value of M is defined in accordance with a prescribed relationship between the size of an ATM cell (53 bytes or 424 bits), the data rate of the port with which the respective 'per port' scheduler is associated, and a scheduler update clock that is used to update the contents of a register within the scheduler. In particular, the value M corresponds to that fraction of an ATM cell by which the contents of the scheduler accumulator must be incremented at each scheduler clock signal (i.e. once per scheduler clock period), in order for the scheduler to properly read out the contents of the cell buffer at the intended data rate of the output port of interest. This will be readily understood from the example to be discussed below.

The value M applied to the scheduler's input port 121 is supplied to a first input 141 of an adder 140, which has a second input 142 coupled to the contents of a register 130. Adder 140 has its output 143 coupled to a first (+) input 151 of a subtraction unit 150, a second (−) input 152 of which is coupled to receive a prescribed value C from a controller 160. The value C corresponds to that value of register 130 that equates to exactly one cell. Controller 160 monitors the contents of an associated 'per port' cell buffer 110-$i$ within the switch fabric, as well as the contents of register 130. The controller generates a 'transfer cell' output, in response to the cell buffer containing a complete ATM cell, and in response to the contents of register 130 being greater than the summation of successive ones of the value M that corresponds to a complete ATM cell. In the course of generating a 'transfer cell' output, the controller 160 supplies the prescribed value C to the (−) input 152 of subtraction unit 150. This operation has the effect of reducing the output 153 of the subtraction unit 150 by the counter value for one cell, namely, the value C.

Subtraction unit 150 has its output 153 coupled to an upper limit comparator 170. Upper limit comparator 170 is operative to compare the output 153 of subtraction unit 150 with the highest count value that can be clocked into the register 130 without causing the register to overflow. As long it is less than this limit value, the output 153 of subtraction unit 150 is coupled through the limit comparator 170 and applied to the input of the register 130, so that this value may be clocked into the register by the update clock. However, if the output 153 of the subtraction unit reaches the limit value, limit comparator 170 disables further incrementing of the register, until the output of the subtraction unit 150 falls below the upper limit value.

Figure 13:
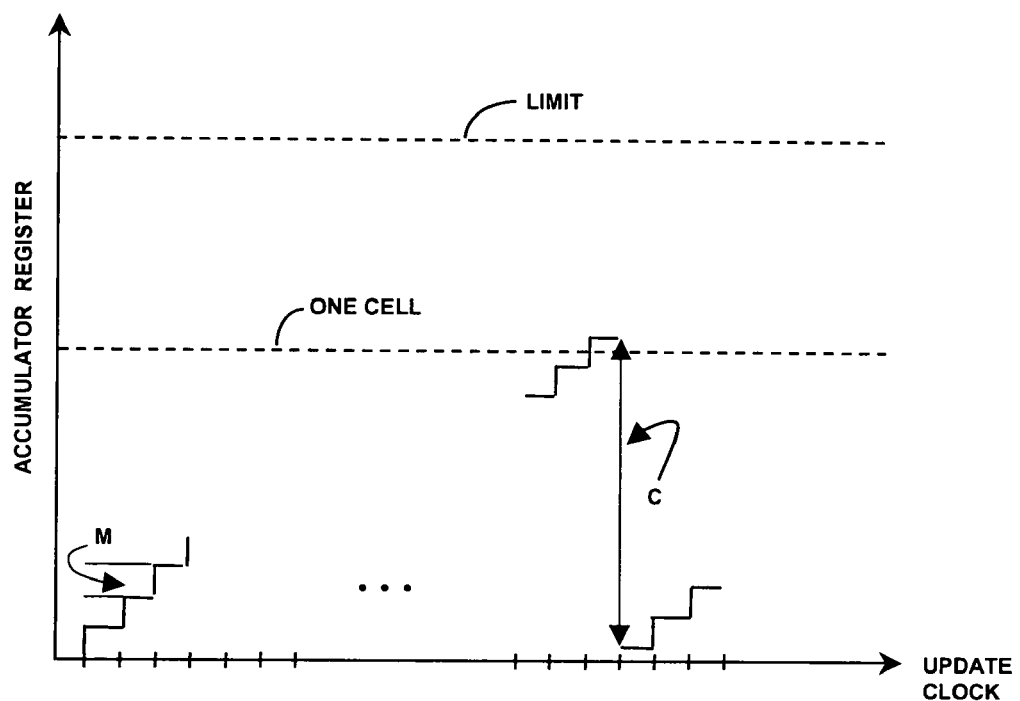
FIG. 13 is a timing diagram associated with the incrementing of the accumulator register of the data transmission scheduler of FIG. 12.
Figure 14:
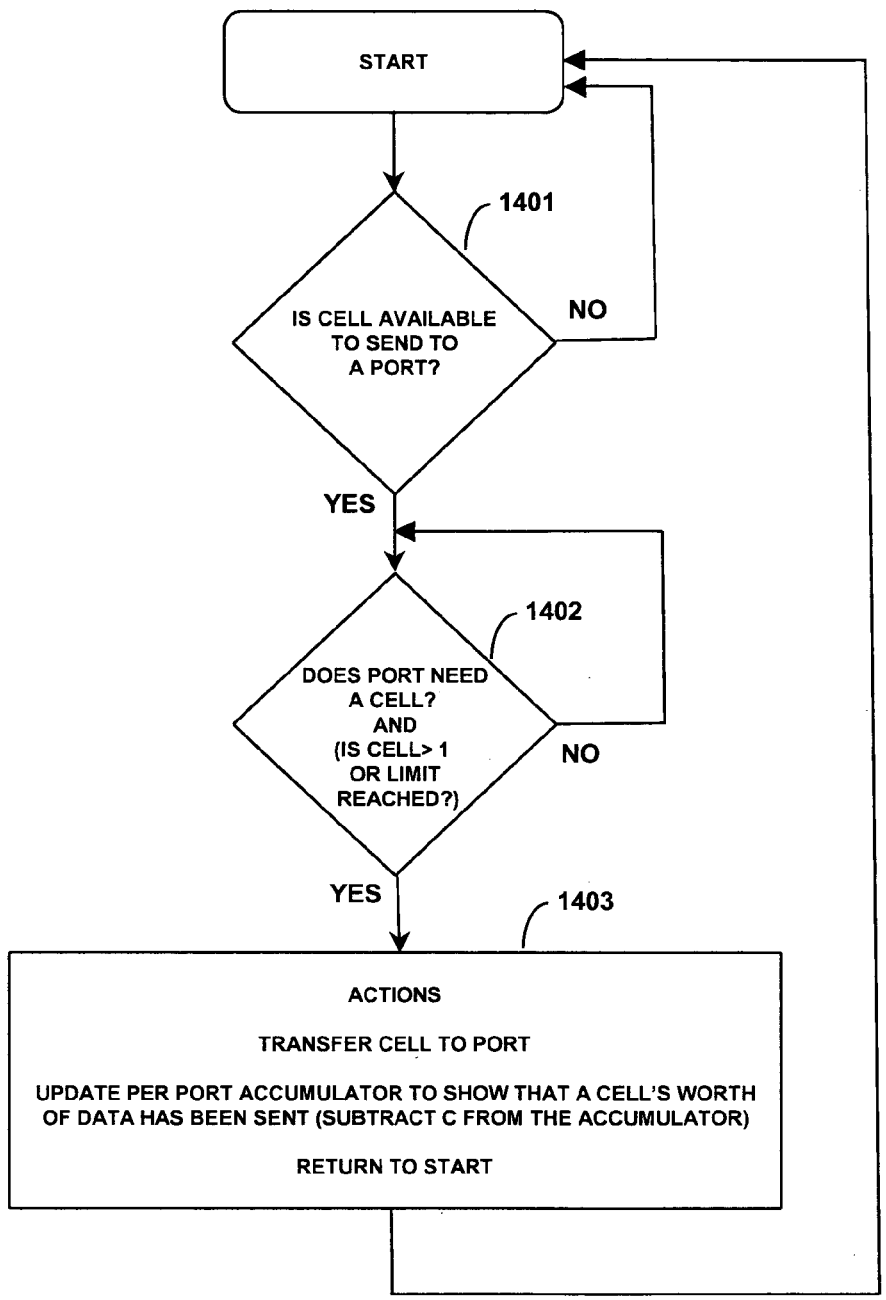
FIG. 14 is a flow chart associated with the operation of the data transmission scheduler of FIG. 12.

The operation of a respective 'per port' scheduler may be readily understood by reference to the accumulator diagram of FIG. 13 and the flow chart of FIG. 14. As described above, the quantity M that is supplied to the adder 140 corresponds to that fraction of an ATM cell by which the contents of the scheduler accumulator must be incremented at each scheduler clock signal (i.e. once per scheduler clock period), in order for the scheduler to properly read out the contents of the cell buffer at the intended data rate of the output port of interest. For the purposes of providing a non-limiting, parametric example, let it be assumed that the data rate of the port of interest is 38.4 kbps, and that the scheduler update clock $C_A$ has a frequency of 250 KHz. With a single ATM cell being 424 bits in length, and with a port data rate of 38.4 kbps, then the effective cell transport rate for the port of interest is equal to $(38.4 \times 10^3$ bits/sec.$) \times (1$ cell/424 bits), or approximately 90.57 cells per second. Since the scheduler update clock $C_A$ of 250 KHz has a period of $1/250 \times 10^{-3} = 4$ microseconds, then at each scheduler update clock $C_A$, the value of M that is applied to the input 141 of adder 140 equals 90.57 cells/sec.$\times 4 \times 10^{-6}$ sec.$= 3.6228 \times 10^{-4}$ cells.

Given this set of parameters, let it be initially assumed that the accumulator register 130 is cleared or reset, so that its value is initially zero. Since the value stored in register 130 is zero, its output to the controller 160 is less than the value corresponding to one cell. This also means that the output of subtraction unit 150 is less than the upper limit of register 130, so that the output of the upper limit comparator 170 to the controller indicates to the controller that the upper limit value has not been reached.

As successive scheduler update clock signals $C_A$ are supplied to register 130 and controller 160, the contents of the register 130 are successively incremented by the value of M that is applied to the adder 140. During this time, as shown by query step 1401 of the flow chart of FIG. 14, the controller continuously checks the state of its cell info input to determine whether or not a cell has been loaded into the associated per port buffer within the switch fabric. Once the answer to query step 1401 is YES, the routine proceeds to query step 1402 to determine whether the threshold >1 cell supplied by register 130 or the limit value supplied by the limit comparator 170 has been reached.

In the present example, the value within register 130 will eventually be greater than the value that equates to one complete cell, shown in the accumulator diagram of FIG. 13 as the threshold >1 cell. When this happens (i.e., the answer to query step 1402 is YES), with the answer to query step 1401 already being a YES, then in step 1403, the controller issues a 'transfer cell' command, causing the cell to be read out of its per port buffer and transmitted downlink to its associated port. In addition, the controller supplies the value C to the (−) input 152 of subtraction unit 150, so that the value C will be subtracted from the sum of the contents of the register 130 and the value M as provided by adder 140, at the next scheduler update clock signal $C_A$. This latter operation means that the incremented level in the accumulator diagram of FIG. 13 (corresponding the contents of the register 130) will be decreased by the value C. The routine then loops back to step 1401 and restarts the process.

As described previously, the limit comparator 170 is employed to prevent overflow of the accumulator register 130. Namely, should the output 153 of the subtraction unit 150 reach the upper limit of the accumulator register, limit comparator 170 will then proceed to disable further incrementing of the register 130, until the output of the subtraction unit 150 falls below the upper limit value. This latter event takes place by the controller supplying the value C to the second input 152 of the subtraction unit 150, in response to the state of the cell info input to the controller. This indicates that the associated per port buffer within the switch fabric contains a complete a cell that is ready for transmission. Until this happens, the limit comparator 170 continues to prevent further incrementing of the register 130.

Channel Bank and Shelf Address Protocol

As pointed out briefly above, and as will be described with reference to FIGS. 15-22, incorporated as part of the DSLAM architecture of the present invention is a inter-channel bank communication mechanism, in particular, a shelf addressing and identification protocol, through which the control processor of the master shelf learns of and handles changes in system configuration, such as the addition, removal or replacement of individual expansion shelves. Through this mechanism the master shelf is able to dynamically track how many shelves make up the system and where those (expansion) shelves are located relative to the master shelf. The master shelf contains the electronic equipment (control unit, line cards, etc.) of the master channel bank. Expansion channel banks are installed in expansion shelves.

In accordance with a preferred embodiment, this expansion shelf identification and tracking methodology corresponds to that described in the '102 application. Pursuant to the methodology disclosed in that application, the master shelf assigns each expansion channel bank a shelf identifier code (or shelf ID code), which is to be included as part of the header of any information packet between the master shelf and an expansion channel bank. Whenever a message is transmitted downstream from the master, a respective expansion channel bank will compare the shelf ID code it has previously been assigned by the master with the shelf ID field in the packet. If the two IDs match, the shelf captures the packet. In addition, irrespective of whether a shelf's ID code matches the shelf ID field of the packet, if the shelf address field of the packet has a prescribed value (e.g., a value of one), the expansion shelf will capture the packet. The shelf address field enables the master to keep track of changes to the participation of expansion shelves within the overall system.

The shelf address field of a packet issued by the master channel bank is used to indicate the physical location of the destination expansion shelf relative to the physical location of the master. The contents of this field are controllably incremented or decremented by one or more intermediate shelves in the course transport of the packet between the master shelf and a destination shelf. The shelf identification or ID code which, in general, is not subject to change, and which is also included as part of a packet header, is the logical address assigned to the expansion shelf by the master in the course of its initializing that shelf. The manner in which these two codes (shelf address code and identification (ID) code) are generated and employed in accordance with the invention disclosed in the '102 application is described in detail below.

Figure 15:
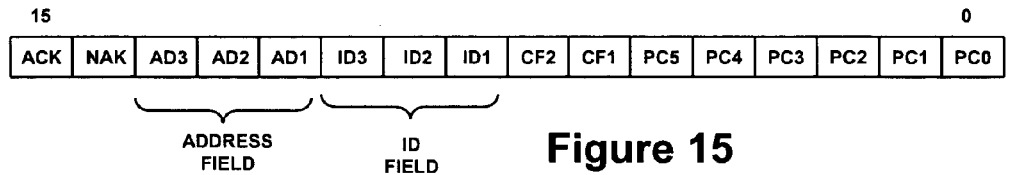
FIG. 15 shows a multi-byte header employed at the front end of packet that may be transmitted from the master shelf to a selected expansion shelf, and also within a response packet sourced from an expansion shelf to the master shelf, in accordance with a protocol, disclosed in the '102 application.

FIG. 15 shows a multi-byte header that is employed at the front end of packet that may be transmitted from the master shelf to a selected expansion shelf, and also within a response packet sourced from an expansion shelf to the master shelf. As shown in FIG. 15, the packet header includes an acknowledge bit (ACK) that is used to acknowledge the successful reception of a packet; receipt of this packet implies that another packet may be sent. The ACK bit is followed by a not-acknowledge bit (NAK) that is used to indicate that the last packet was received in error and requires retransmission.

A multi-bit shelf address field, shown as comprising three address bits AD1, AD2 and AD3, is normally used to specify the physical location of an expansion shelf relative to the master shelf. It should be noted that the number of bits that make up the shelf address field and also the shelf identification field to be described is not limited to three or any other number. Three is a practical number as it readily accommodates a DSLAM system comprised of a master shelf and up to six expansion shelves. The bit pattern 111 is reserved for a special case for 'discovery' packets, as will be described.

In the downstream direction, except for the special case of a 'discovery' or 'who are you?' initialization query packet (wherein the shelf address field is set to all ones), the value of the shelf address field for a packet sourced from the master is initially set at a value that corresponds to what the master believes to be the physical location of the destination expansion shelf relative to the master shelf (namely how many shelves away from the master is the destination shelf). Thus, if the destination shelf is two shelves away from the master, the master will set the shelf address field to a value of two. Also, except for the special case of a 'discovery' packet, in the course of a packet being relayed in the downstream direction, the value of the packet's shelf address field is decremented by a value of one by each shelf that is located between the master shelf and the destination shelf. This should ultimately cause the value of the shelf address field to have a value of one when the packet arrives at its intended expansion shelf destination. For the case of a 'discovery' packet, the all one's value of the address field is not decremented.

In the upstream direction, the value of the address field is always initially set at a value of one by the expansion shelf sourcing the packet. The address field of this packet is then incremented by a value of one by each shelf that is located between the sourcing shelf and the master shelf. As a consequence, when the packet arrives at the master shelf, the value of its address field will specify the physical location of the sourcing shelf relative to the master (namely, how many shelves away from the master is the sourcing shelf).

A multi-bit shelf identification (ID) field, comprising three bits ID1, ID2 and ID3, is used by the master to identify the downstream expansion shelf for whom the packet is destined, and is used by an expansion shelf to inform the master from which shelf did the packet originate. Whenever a packet is received by an expansion shelf, that shelf compares the ID field of the packet with its shelf ID code. That shelf's ID code will either have been previously assigned to it by the master (during an initialization routine, to be described), or has the value of all ones, associated with the fact that the expansion shelf is currently uninitialized. Whenever the ID field matches the expansion shelf's ID code, that shelf will capture the message. In addition to capturing a packet whose ID field matches its shelf ID code, an expansion shelf will also capture a packet whose address field equals the value of one. As will be described, this enables the master shelf to keep track of which shelves physically occupy which shelf locations, and accommodates removal or rearranging of the shelf connections to the daisy chained upstream and downstream communication paths.

A two bit control field comprised of control field bits is used to indicate the beginning, middle and end of the packet, while a six bit process identification field is used to specify a higher level process for which the data packet is intended. When a shelf acknowledges a packet, it mirrors back the process ID field of the packet it has just received.

As pointed out briefly above, it is the shelf address and the shelf ID fields of the packet header, and the manner in which the shelf address field is selectively modified at a respective expansion shelf in accordance with the inventive addressing protocol, which enables the functionality of the invention disclosed in the '102 application to be successfully implemented.

Figure 16:
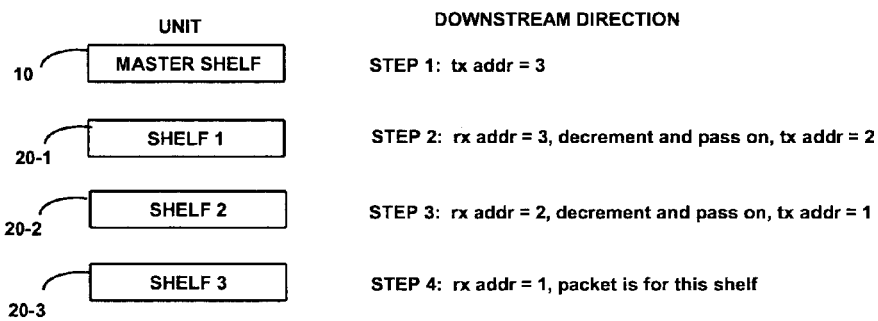
FIG. 16 diagrammatically illustrates the four shelf system of FIG. 1, together with packet interface operations that take place along the downstream travel path of a packet through the shelves.

To illustrate the operation of this addressing protocol, consider the four shelf system shown in left-hand portion of FIG. 16, which effectively corresponds to the four shelf system of FIG. 3, having a master shelf 10 and three expansion shelves 20-1, 20-2 and 20-3. The right-hand portion of FIG. 16 shows packet interface operations that take place along the downstream travel path of a packet through the shelves.

Pursuant to this example, let it be initially assumed that the master shelf 10 intends to communicate with the farthest away expansion shelf (the third shelf 20-3 in FIG. 16). In this case, master shelf 10 sets the address field of the downstream directed packet to a value of three (011), sets the ID field to the ID of shelf 20-3 (e.g., 011), and forwards the packet to the first downstream shelf 20-1. Shelf 20-1 reads the contents of the shelf ID field as well as the address field (which is three (011) in the example). Since the packet's shelf ID field does not match the shelf ID code (001) of the first shelf, and the packet's shelf address field is not equal to a value of one, the first shelf knows that the message is not intended for it. Shelf 20-1 therefore decrements the current value (three (011)) of the packet's shelf address field by a value of one, leaving a shelf address field value of two (010), and relays the packet on downstream to the second expansion shelf 20-2.

As is the case with the first expansion shelf 20-1, the second shelf 20-2 reads the contents of the packet's shelf ID field (011) and also the contents of the shelf address field (which has been decremented to a value of two (010)). Since the shelf ID field (011) does not match the shelf ID (010) of the second shelf 20-2, and since the shelf address field is not equal to a value of one, the second shelf 20-2 knows that the message is not intended for it. Therefore, like the first shelf 20-1, shelf 20-2 responds to the packet by decrementing the contents of the shelf address field by a value of one, so as to produce a packet having its shelf address field equal to a value of one (001). Shelf 20-2 then relays the packet downstream to the third expansion shelf 20-3.

When the packet arrives at the shelf 20-3, that shelf reads contents (011) of the shelf ID field and the contents of the shelf address field (which has been decremented to a value one (001) by the second channel bank 20-2). When the third shelf 20-3 sees that the contents (011) of the shelf ID field matches its ID code (011), it knows that the message is intended for it. Shelf 20-3 therefore captures the packet. Moreover, even if, for some reason, the shelf ID field did not match the ID code of the third shelf, shelf 20-3 would still capture the packet, since the contents of the address field has a value of one. The use of this 'address equals one' packet capture rule to inform the master of a change in system configuration will be discussed below.

Figure 17:
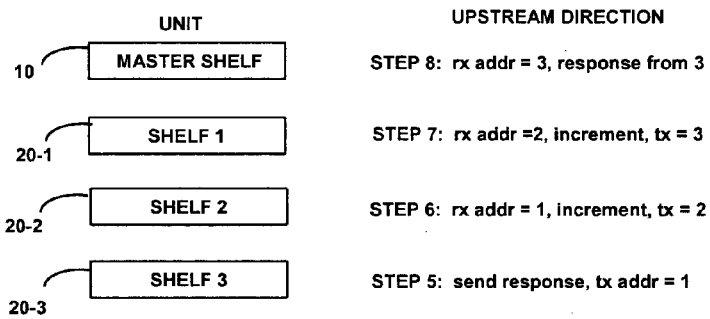
FIG. 17 diagrammatically illustrates the four shelf system of FIG. 1, together with packet interface operations that take place along the upstream travel path of a packet through the shelves.

FIG. 17 shows a packet transport communication that is complementary relative to the example of FIG. 16. Namely, FIG. 17 illustrates the case of transmitting a packet from the third expansion shelf 20-3 upstream to master shelf 10. As noted above, (in addition to inserting its ID code in the packet header shelf ID field) any shelf sourcing a response packet to the master initially sets the address field of the packet equal to a value of one (001). Then, as the packet is relayed upstream, each expansion shelf between the packet-sourcing shelf and the master shelf will increment the contents of the packet's shelf address field by a value of one and send the packet upstream to the next shelf.

For the three expansion shelf example of FIG. 17, the number two shelf 20-2 increments the packet's shelf address field from its initial value of one (001) to a value of two (010), and then forwards the packet to the next shelf in the upstream direction—the first expansion shelf 20-1. Shelf 20-1 also increments the contents of the packet's shelf address field (having a value of two (010)) by a value of one, so that the contents of the shelf address field becomes a value of three (011). Shelf 20-1 then forwards the packet to the master. When the packet arrives at the master shelf, its address field has a value of three (011), which informs the master that the packet-sourcing shelf is three units downstream from it, namely, expansion shelf 20-3. The shelf ID field also informs the master that the shelf installed in shelf bay number three has a shelf ID code of three, as the master shelf would normally expect.

In addition to successive modification (incrementing in the upstream direction and decrementing in the downstream direction) of the contents of the packet's shelf address field to indicate to whom a packet is to be delivered and from whom a packet is sourced, the present invention also keeps track of installed equipment shelves by means of the shelf ID field, which is downloaded from the master when an expansion shelf is initialized. To gain an appreciation of the use of this shelf ID field in conjunction with the shelf address field, the manner in which the shelf address and shelf ID fields are generated and used will now be described.

Figure 18:
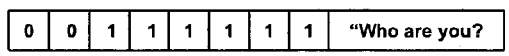
FIGS. 18-21 show examples of the contents of shelf address and identification fields within the headers of packets used for the initialization of subtended expansion shelves of a multi channel bank DSLAM system.

As noted previously, when an expansion shelf is initially inserted into an expansion shelf bay and is powered up, that shelf is in an uninitialized state, with its shelf ID field yet to be assigned. In accordance with the invention, an uninitialized shelf initially sets its shelf ID code to a prescribed default value, e.g., all ones (111). In order to initialize an expansion shelf, the master shelf sends a unique 'discovery' or 'who are you?' packet, in which both the shelf address and shelf ID fields are set to all ones, as shown in FIG. 18. As noted above, this packet is unique, as one of the rules of the messaging protocol is that no shelf is allowed to decrement a shelf ID field of all ones.

Figure 19:
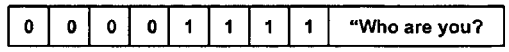

The first uninitialized shelf in the downstream direction from the master shelf will have its shelf ID field set to a default value of all ones (111), as noted above. As a result, in response to receiving a 'discovery' packet from the master, the uninitialized shelf will detect a match between its all ones (111) shelf ID field and the all ones (111) contents of the shelf ID field in the 'discovery' packet. As a consequence the uninitialized shelf will capture the 'discovery' packet. In accordance with the protocol described herein, the uninitialized shelf responds to the receipt of a 'discovery' packet by sending back a reply packet to the master. Since the uninitialized shelf is the one sourcing the packet in the upstream direction, then, pursuant to the communication protocol described above, it sets the packet's address field to a value of one (001). In addition, since it has not yet been assigned a shelf ID from the master, it inserts the default shelf ID code of all ones (111) into the shelf ID field of the reply packet, as shown in FIG. 19.

As the reply packet is transmitted in the upstream direction to the master shelf, any expansion shelf prior to the master will proceed in the manner described earlier, incrementing the contents of the packet's shelf address field by a value of one, and then passing the packet towards the master shelf. Upon receipt of the reply packet from the uninitialized shelf, the master will know how far away the uninitialized shelf is from the master by the value the reply packet's shelf address field, as described above. Since the location of the uninitialized expansion shelf relative to the master shelf is now known, the master is able to initialize the expansion shelf, assigning it a shelf ID.

As a non-limiting example, let it be assumed that the uninitialized shelf happens to be the first expansion shelf (shelf 20-1), which is the closest expansion shelf to the master. This means that the original contents (001) of the address field in the reply packet will not have been incremented prior to arrival of the reply packet at the master, so that the master knows that the uninitialized shelf is the first expansion shelf 20-1. In order to initialize this shelf, the master will transmit an 'assign shelf ID' packet, whose shelf address field has a value of one (001)—corresponding to the contents of the shelf address field in the reply packet which the master shelf has received from the first expansion shelf 20-1, as described above.

Figures 20, 21, 22:
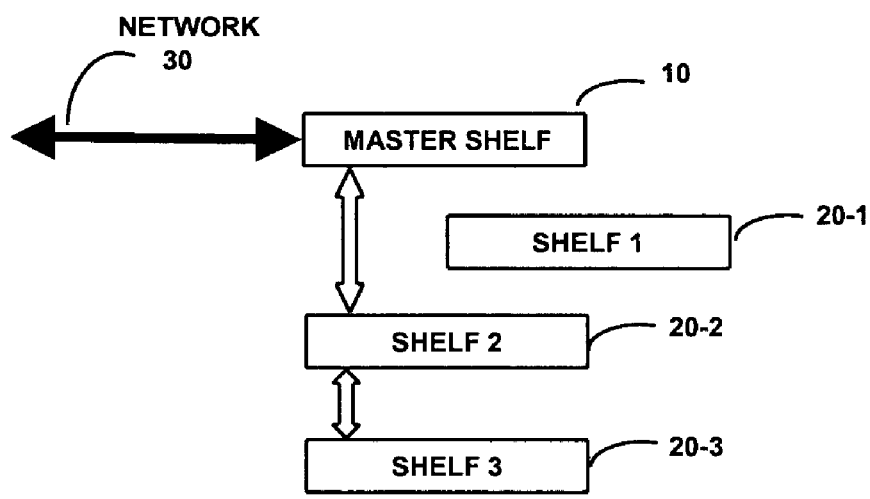
FIG. 22 shows a modification of the four shelf DSLAM system of FIG. 1, in which the first expansion shelf has been removed.

The value of the shelf ID code is quasi-arbitrary; from a practical standpoint, it is preferably chosen to match the physical address, namely it has a value of one (001), as shown in FIG. 20. In response to this 'assign ID' packet, the addressed shelf (shelf 20-1) replaces its default ID code of all ones (111) with its newly assigned value of one (001) for use in future communications with the master. It then sends a reply packet to the master, in which each of the address field and the ID field has a value of one (001), as shown in FIG. 21. This completes the initialization procedure for the first shelf.

If any other shelf is uninitialized, the master will proceed to send the 'discovery' message down the chain of expansion shelves. As described above, only a shelf awaiting initialization by the master will have its shelf ID code set to a value of all ones (111), so that only an uninitialized shelf will respond to the 'discovery' packet. It may be recalled that the shelf provisioning protocol described herein is such that no shelf is allowed to decrement the all ones address field of a 'discovery' packet. This ensures that the 'discovery' packet will be relayed by respective initialized shelves unmodified until the packet reaches an uninitialized shelf and causes the routine described above to be carried out for that shelf. The master will know that all expansion shelves of the multi channel bank system have been initialized, when no response is received to a 'discovery' packet. The master may periodically issue a 'discovery' packet to find any new shelves, as well as shelves that may have reset themselves (for example, due to a watchdog time out, and the like).

Because the DSLAM system is formed of a master shelf and some number of expansion shelves connected together in a daisy chain manner, as by way of front panel connectors (typically RJ-45 connectors), the possibility of a shelf becoming disconnected and then reconnected into a different order in the daisy chain sequence is relatively high. Fortunately, the use of a variable shelf address field and a fixed shelf ID field in the packet header is able to successfully enable the master shelf to determine if and where a subtended shelf has been moved.

Consider, for example, the four shelf system described above, comprised of a master shelf 10 and the three expansion shelves 20-1, 20-2 and 20-3. Now let it be assumed that expansion shelf 20-1 needs to be replaced, while the remaining two shelves 20-2 and 20-3 are to remain connected to the master shelf. For this purpose, the technician replaces the connection between the master shelf 10 and the first expansion shelf 20-1 with a connection from the master shelf 10 to the second expansion shelf 20-2, as shown in FIG. 22. With this rewired configuration, it is intended that the DSLAM system continue to pass data to the customers being serviced by expansion shelves 20-2 and 20-3.

When the master polls shelf 20-1, it will notice that the shelf ID field of the response packet contains the shelf ID code for expansion shelf 20-2, rather than the shelf ID code for removed shelf 20-1. Since the ID code for the second shelf 20-2 is not what the master expected, the master now knows that shelf 20-1 has been moved and that the closest expansion shelf is shelf 20-2, rather than shelf 20-1. The master shelf now knows that to communicate with expansion shelf 20-2, it must insert a value of one (001) in the packet's shelf address field and a value of two (010) in the shelf ID field of the header of a packet intended for shelf 20-2. Operating in this manner will still allow the shelves to be referenced by their original shelf ID codes, namely menus can continue to refer to shelf 20-2 as shelf 20-2, even though shelf 20-2 now physically occupies the location of previous shelf 20-1.

The address mechanism described above allows all the shelves to be disconnected and shuffled to new locations; still the master shelf is able to keep up with their new locations because of the ID fields. When a replacement shelf is reinserted into the location of shelf 20-1, it will go through the shelf initialization routine described above, allowing the master to adjust back to the old shelf locations. The master shelf retains an expansion shelf's location in EEPROM, so that after a power cycle, the master will be able to promptly reconstruct a shuffled stack of expansion shelves with their corresponding shelf IDs.

As will be appreciated from the foregoing description, shortcomings of conventional schemes for expanding the number of ports that can serviced by a DSLAM, including bus extension and channel bank subtending, are effectively obviated by the single switch fabric-based, multi-channel bank DSLAM architecture according to the present invention, which employs a centralized scheduler for downstream communications from the network to line card ports, and distributed policing and cell rate control mechanisms for controlling upstream-directed communications from line card ports of each expansion channel bank. In addition, the invention employs a shelf addressing and identification protocol, through which the master shelf is able to dynamically track how many shelves make up the system and where those (expansion) shelves are located relative to the master.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A multi-channel bank system for interfacing a telecommunication network with a plurality of customer circuits comprising:

a master channel bank containing a switch fabric coupled to said telecommunication network, and a plurality of line cards, each line card of said master channel bank having a plurality of ports coupled to customer circuits;

at least one expansion channel bank having a plurality of line cards, each line card of a respective expansion channel bank having a plurality of ports coupled to customer circuits;

a downstream multiplexed communication path coupled to said master channel bank and to said at least one expansion channel bank, and being operative to transport communication packets, supplied by said network to said switch fabric of said master channel bank, to destination ports of line cards of said master and expansion channel banks for delivery to customer circuits; and an upstream multiplexed communication path coupled to said master channel bank and to said at least one expansion channel bank, and being operative to transport communication packets, supplied by customer circuits to customer ports of line cards of said master and expansion channel banks, to said switch fabric of said master channel bank for delivery therefrom to said network.

2. The system according to claim 1, wherein said master channel bank further includes a downstream directed communication packet traffic scheduler, coupled to said switch fabric and being operative to controllably cause communication packets, coupled from said network for storage in buffer circuitry of said switch fabric, to be transported over said downstream multiplexed communication path to destination ports of line cards of said master and expansion channel banks for delivery to customer circuits coupled thereto.

3. The system according to claim 1, wherein said downstream multiplexed communication path includes:

a plurality of downstream multiplexers, respective ones of which reside in said master channel bank and said at least one expansion channel bank, and downstream inter-channel bank communication links, a respective one of which is coupled between an output of a downstream multiplexer of a relatively upstream channel bank and an input of a downstream multiplexer of a relatively downstream channel bank; and wherein said upstream multiplexed communication path includes:

a plurality of upstream multiplexers, respective ones of which reside in said master channel bank and said at least one expansion channel bank, and upstream inter-channel bank communication links, a respective one of which is coupled between an output of an upstream multiplexer of a relatively downstream channel bank and an input of an upstream multiplexer of a relatively upstream channel bank.

4. The system according to claim 3, wherein each of said downstream and upstream inter-channel bank communication links comprises a Giga-bit Media Independent Interface (GMII).

5. The system according to claim 1, wherein said master channel bank includes a master channel bank policing mechanism for controlling the transport of upstream-directed communication packets from line card ports of said master channel bank to said switch fabric, and wherein a respective expansion channel bank includes an expansion channel bank policing mechanism for controlling the transport of upstream-directed communication packets from line card ports of said expansion channel bank to said switch fabric of said master channel bank.

6. The system according to claim 1, wherein said switch fabric of said master channel bank has a prescribed maximum composite upstream data rate at which it will accept packets from said master channel bank and each of said at least one expansion channel bank combined, and wherein each of said master channel bank and said at least one expansion channel bank operates at the same upstream data rate, that is no faster than said prescribed maximum composite upstream data rate divided by M, wherein M=N+1, and N is the total number of expansion channel banks of said system.

7. The system according to claim 1, wherein said downstream multiplexed communication path includes:

a plurality of downstream multiplexers, respective ones of which reside in said master channel bank and said at least one expansion channel bank, and downstream inter-channel bank communication links, a respective one of which is coupled between an output of a downstream multiplexer of a relatively upstream channel bank and an input of a downstream multiplexer of a relatively downstream channel bank; and wherein outputs of said downstream multiplexers are coupled to respective downstream transceivers of said master channel bank and said at least one expansion channel bank, and wherein each of said downstream transceivers is operative to recover timing signals synchronized to network timing from downstream directed communication packets transported over a respective downstream inter-channel bank communication link from a relatively upstream channel bank, and to incorporate recovered network timing in further downstream directed communication packets transmitted by said downstream transceiver over a respective downstream inter-channel bank communication link to a relatively downstream channel bank.

8. The method according to claim 7, wherein a downstream transceiver of a respective channel bank includes a receiver interface coupled to a respective downstream inter-channel bank communication link from a relatively upstream channel bank, said receiver interface having a data recovery port coupled to a line card of said respective channel bank, and a clock recovery port coupled to a phase locked loop that produces a transmit clock locked to network timing, said transmit clock providing transmission timing for a transmitter interface driving a further respective downstream inter-channel bank communication link that is coupled to a relatively downstream channel bank.

9. The system according to claim 8, wherein each of said downstream inter-channel bank communication links comprises a Giga-bit Media Independent Interface (GMII).

10. A multi-channel bank system for interfacing a telecommunication network with a plurality of customer circuits comprising:

a master channel bank containing a switch fabric coupled to said telecommunication network, and a plurality of line cards, each line card of said master channel bank having a plurality of ports coupled to customer circuits served by said master channel bank;

a plurality of expansion channel banks, each expansion channel bank having a plurality of line cards, a respective line card having a plurality of ports coupled to customer circuits served by said respective expansion channel bank; and a downstream multiplexed communication path coupled among said master channel bank and said plurality of expansion channel bank, and being operative to transport communication packets, supplied by said network to said switch fabric of said master channel bank, to destination ports of line cards of said master and expansion channel banks for delivery to customer circuits served thereby, and wherein said downstream multiplexed communication path includes successive segments that are operative to recover timing signals synchronized to network timing from downstream directed communication packets transported over said downstream multiplexed communication path from a relatively upstream channel bank, and to incorporate recovered network timing in further downstream directed communication packets transmitted over said downstream multiplexed communication path to a relatively downstream channel bank.

11. The system according to claim 10, wherein said master channel bank further includes a downstream directed communication packet traffic scheduler, coupled to said switch fabric, and being operative to controllably cause communication packets, coupled from said network for storage in buffer circuitry of said switch fabric, to be transported over said downstream multiplexed communication path to destination ports of line cards of said master and expansion channel banks for delivery to customer circuits.

12. The system according to claim 10, wherein said downstream multiplexed communication path comprises a Giga-bit Media Independent Interface (GMII).

13. The system according to claim 10, wherein said downstream multiplexed communication path includes a plurality of downstream multiplexers, respective ones of which reside in said master channel bank and said plurality of expansion channel banks, and downstream inter-channel bank communication links, a respective one of which is coupled between an output of a downstream multiplexer of a relatively upstream channel bank and an input of a downstream multiplexer of a relatively downstream channel bank.

14. A multi-channel bank system for interfacing a telecommunication network with a plurality of customer circuits comprising:

a master channel bank containing a switch fabric coupled to said telecommunication network, and a plurality of line cards, each line card of said master channel bank having a plurality of ports coupled to customer circuits served by said master channel bank;

a plurality of expansion channel banks, each expansion channel bank having a plurality of line cards, a respective line card having a plurality of ports coupled to customer circuits served by said respective expansion channel bank; and an upstream multiplexed communication path coupled to said master channel bank and to said plurality of expansion channel banks, and being operative to transport communication packets, supplied by customer circuits to customer ports of line cards of said master and expansion channel banks, to said switch fabric of said master channel bank for delivery therefrom to said network.

15. The system according to claim 14, wherein said upstream multiplexed communication path includes:

a plurality of upstream multiplexers, respective ones of which reside in said master channel bank and said plurality of expansion channel banks, and upstream inter-channel bank communication links, a respective one of which is coupled between an output of an upstream multiplexer of a relatively downstream channel bank and an input of an upstream multiplexer of a relatively upstream channel bank.

16. The system according to claim 15, wherein each of said upstream inter-channel bank communication links comprises a Giga-bit Media Independent Interface (GMII).

17. The system according to claim 15, wherein said master channel bank includes a master channel bank policing mechanism for controlling the transport of upstream-directed communication packets from line card ports of said master channel bank to said switch fabric, and wherein a respective expansion channel bank includes an expansion channel bank policing mechanism for controlling the transport of upstream-directed communication packets from line card ports of said expansion channel bank to said switch fabric of said master channel bank.

18. The system according to claim 15, wherein said switch fabric of said master channel bank has a prescribed maximum composite upstream data rate at which it will accept packets from said master channel bank and each of said expansion channel banks combined, and wherein said master channel bank and each of said expansion channel banks operates at the same upstream data rate, that is no faster than said prescribed maximum composite upstream data rate divided by M, wherein M=N+1, and N is the total number of expansion channel banks of said system.

19. A multi-channel bank system for interfacing a telecommunication network with a plurality of customer circuits comprising:
- a master channel bank containing a switch fabric coupled to said telecommunication network, and a plurality of line cards, each line card of said master channel bank having a plurality of ports coupled to customer circuits;
- at least one expansion channel bank having a plurality of line cards, each line card of a respective expansion channel bank having a plurality of ports coupled to customer circuits;
- an upstream multiplexed communication path coupled to said master channel bank and to said at least one expansion channel bank, and being operative to transport communication packets, supplied by customer circuits to customer ports of line cards of said master and expansion channel banks, to said switch fabric of said master channel bank for delivery therefrom to said network; and
- a plurality of policing mechanisms respectively distributed within said master and expansion channel banks and being operative to control transport of upstream-directed communication packets from line card ports of said master and expansion channel banks to said switch fabric.

20. The system according to claim 19, wherein said switch fabric of said master channel bank has a prescribed maximum composite upstream data rate at which it will accept packets from said master channel bank and each of said at least one expansion channel bank combined, and wherein each of said master channel bank and said at least one expansion channel bank operates at the same upstream data rate, that is no faster than said prescribed maximum composite upstream data rate divided by M, wherein M=N+1, and N is the total number of expansion channel banks of said system.

* * * * *